(12) United States Patent
Gabel et al.

(10) Patent No.: US 10,083,009 B2
(45) Date of Patent: Sep. 25, 2018

(54) DYNAMICALLY EVOLVING COGNITIVE ARCHITECTURE SYSTEM PLANNING

(71) Applicant: VIV LABS, INC., San Jose, CA (US)

(72) Inventors: Mark Gabel, San Jose, CA (US); Christopher Brigham, San Jose, CA (US); Adam Cheyer, San Jose, CA (US)

(73) Assignee: VIV LABS, INC., San Jose, CA (US)

( * ) Notice: Subject to any disclaimer, the term of this patent is extended or adjusted under 35 U.S.C. 154(b) by 0 days.

(21) Appl. No.: 14/306,903

(22) Filed: Jun. 17, 2014

(65) Prior Publication Data

US 2014/0380268 A1    Dec. 25, 2014

Related U.S. Application Data

(60) Provisional application No. 61/837,354, filed on Jun. 20, 2013, provisional application No. 61/888,907, filed on Oct. 9, 2013, provisional application No. 61/917,541, filed on Dec. 18, 2013.

(51) Int. Cl.
| | |
|---|---|
| *G06F 9/44* | (2018.01) |
| *G06F 9/45* | (2006.01) |
| *G06F 8/00* | (2018.01) |
| *G06F 17/27* | (2006.01) |

(Continued)

(52) U.S. Cl.
CPC .............. *G06F 8/00* (2013.01); *G06F 17/277* (2013.01); *G06F 17/28* (2013.01); *G06N 5/02* (2013.01)

(58) Field of Classification Search
CPC ................ G06F 8/10; G06F 8/20–8/38; G06F 17/2765; G06F 8/00; G06F 17/28; G06F 17/277–17/279; G06N 5/02–5/025
See application file for complete search history.

(56) References Cited

U.S. PATENT DOCUMENTS

| | | |
|---|---|---|
| 6,182,062 B1 | 1/2001 | Hiromichi et al. |
| 6,282,537 B1 | 8/2001 | Madnick et al. |
| 6,513,063 B1 | 1/2003 | Julia et al. |

(Continued)

FOREIGN PATENT DOCUMENTS

WO    2013067001    5/2013

OTHER PUBLICATIONS

Mauro Da Lio, Will Intelligent Vehicles Evolve into Human-peer Robots?, 2012, pp. 304-309 https://ieeexplore.ieee.org/stamp/stamp.jsp?tp=&arnumber=6232142 (Year: 2012).*

(Continued)

*Primary Examiner* — Mongbao Nguyen
(74) *Attorney, Agent, or Firm* — Dergosits & Noah LLP; Todd A. Noah

(57) ABSTRACT

Dynamically evolving cognitive architecture system planning is described. A system forms an intent based on a user input, and creates a plan based on the intent. The plan includes a first action object that transforms a first concept object associated with the intent into a second concept object and also includes a second action object that transforms the second concept object into a third concept object associated with a goal of the intent. The first action object and the second action object are selected from multiple action objects. The system executes the plan, and outputs a value associated with the third concept object.

17 Claims, 18 Drawing Sheets

(51) Int. Cl.
  *G06F 17/28* (2006.01)
  *G06N 5/02* (2006.01)

(56) References Cited

U.S. PATENT DOCUMENTS

| | | | |
|---|---|---|---|
| 6,523,061 B1 | 2/2003 | Halverson et al. | |
| 6,691,151 B1 | 2/2004 | Cheyer et al. | |
| 6,757,718 B1 | 6/2004 | Halverson et al. | |
| 6,851,115 B1 | 2/2005 | Cheyer et al. | |
| 6,859,931 B1 | 2/2005 | Cheyer et al. | |
| 7,036,128 B1 | 4/2006 | Julia et al. | |
| 7,069,560 B1 | 6/2006 | Cheyer et al. | |
| 7,716,199 B2 | 5/2010 | Guha | |
| 8,126,832 B2 | 2/2012 | Spring | |
| 8,266,092 B2* | 9/2012 | Kuhn | G06Q 10/04 706/55 |
| 8,312,042 B2 | 11/2012 | LeBeau et al. | |
| 8,346,563 B1 | 1/2013 | Hjelm et al. | |
| 8,370,146 B1 | 2/2013 | Schalkwyk et al. | |
| 8,417,715 B1 | 4/2013 | Bruckhaus et al. | |
| 8,429,179 B1 | 4/2013 | Mirhaji | |
| 8,434,075 B1* | 4/2013 | Brown et al. | 717/151 |
| 8,447,607 B2 | 5/2013 | Weider et al. | |
| 8,484,017 B1 | 7/2013 | Sharifi et al. | |
| 8,504,508 B2 | 8/2013 | Spring | |
| 8,521,723 B1* | 8/2013 | Ahmed | G06F 17/30448 707/714 |
| 8,589,382 B2* | 11/2013 | Betawadkar-Norwood | G06F 17/30451 707/706 |
| 8,660,849 B2 | 2/2014 | Gruber et al. | |
| 8,670,979 B2 | 3/2014 | Gruber et al. | |
| 8,677,377 B2 | 3/2014 | Cheyer et al. | |
| 8,682,649 B2 | 3/2014 | Bellegarda | |
| 8,706,472 B2 | 4/2014 | Ramerth et al. | |
| 8,706,503 B2 | 4/2014 | Cheyer et al. | |
| 8,706,827 B1 | 4/2014 | Noble | |
| 8,719,006 B2 | 5/2014 | Bellegarda | |
| 8,731,942 B2 | 5/2014 | Cheyer et al. | |
| 8,762,156 B2 | 6/2014 | Chen | |
| 8,776,011 B2 | 7/2014 | Sharma et al. | |
| 8,799,000 B2 | 8/2014 | Guzzoni et al. | |
| 8,825,560 B2 | 9/2014 | Hodjat et al. | |
| 8,892,446 B2 | 11/2014 | Cheyer et al. | |
| 8,903,716 B2 | 12/2014 | Chen et al. | |
| 8,918,349 B2 | 12/2014 | Hodjat et al. | |
| 8,930,180 B1 | 1/2015 | Murray et al. | |
| 8,930,191 B2 | 1/2015 | Gruber et al. | |
| 8,942,986 B2 | 1/2015 | Cheyer et al. | |
| 8,954,419 B2* | 2/2015 | Apte | G06F 17/30492 707/718 |
| 8,996,504 B2* | 3/2015 | Aluc | G06F 17/30433 707/718 |
| 9,081,411 B2 | 7/2015 | Kalns et al. | |
| 9,082,402 B2 | 7/2015 | Yadgar et al. | |
| 9,085,303 B2 | 7/2015 | Wolverton et al. | |
| 9,098,492 B2 | 8/2015 | Tunstall-Pedoe | |
| 9,110,882 B2 | 8/2015 | Overell | |
| 9,117,447 B2 | 8/2015 | Gruber et al. | |
| 9,122,744 B2 | 9/2015 | Spivack | |
| 9,172,747 B2 | 10/2015 | Walters et al. | |
| 9,064,006 B2 | 11/2015 | London | |
| 9,183,183 B2 | 11/2015 | Barve et al. | |
| 9,189,742 B2 | 11/2015 | London | |
| 9,223,537 B2 | 12/2015 | Brown et al. | |
| 9,262,612 B2 | 2/2016 | Cheyer et al. | |
| 9,275,641 B1 | 3/2016 | Gelfenbeyn et al. | |
| 9,280,610 B2 | 3/2016 | Gruber et al. | |
| 9,292,254 B2 | 3/2016 | Simpson et al. | |
| 9,311,298 B2 | 4/2016 | Sarikaya et al. | |
| 9,311,599 B1 | 4/2016 | Attenberg | |
| 9,318,108 B2 | 4/2016 | Gruber et al. | |
| 9,367,607 B2* | 6/2016 | Vee | G06F 17/3043 |
| 9,443,199 B2 | 9/2016 | Pinckney et al. | |
| 9,502,029 B1* | 11/2016 | Bell | G10L 15/22 |
| 2002/0116420 A1 | 8/2002 | Allam et al. | |
| 2003/0046201 A1 | 3/2003 | Cheyer | |
| 2004/0019609 A1 | 1/2004 | Orton et al. | |
| 2004/0030674 A1 | 2/2004 | Nagano et al. | |
| 2005/0149372 A1 | 7/2005 | Kite et al. | |
| 2005/0160107 A1 | 7/2005 | Liang | |
| 2005/0160414 A1 | 7/2005 | Pamanen et al. | |
| 2005/0165607 A1 | 7/2005 | Di Fabbrizio et al. | |
| 2005/0267871 A1 | 12/2005 | Marchisio et al. | |
| 2006/0074980 A1* | 4/2006 | Sarkar | G06F 17/3089 |
| 2006/0095556 A1 | 5/2006 | Arnold et al. | |
| 2006/0136194 A1 | 6/2006 | Armstrong et al. | |
| 2007/0033005 A1 | 2/2007 | Cristo et al. | |
| 2007/0055529 A1 | 3/2007 | Kanevsky et al. | |
| 2007/0122749 A1 | 5/2007 | Fu et al. | |
| 2007/0250901 A1 | 10/2007 | McIntire et al. | |
| 2007/0255826 A1 | 11/2007 | Billingsley | |
| 2007/0288247 A1 | 12/2007 | Mackay | |
| 2007/0299713 A1 | 12/2007 | Macbeth et al. | |
| 2007/0299838 A1 | 12/2007 | Behrens et al. | |
| 2008/0010240 A1* | 1/2008 | Zait | G06F 17/30463 |
| 2008/0071521 A1 | 3/2008 | Larvet | |
| 2008/0086343 A1* | 4/2008 | Pendergraft | G06Q 10/0637 705/7.29 |
| 2008/0288320 A1* | 11/2008 | Ockers et al. | 705/9 |
| 2009/0125370 A1 | 5/2009 | Blondeau et al. | |
| 2009/0144609 A1 | 6/2009 | Liang | |
| 2009/0164441 A1 | 6/2009 | Cheyer | |
| 2009/0276380 A1 | 11/2009 | Acero et al. | |
| 2010/0049676 A1 | 2/2010 | Devit et al. | |
| 2010/0145678 A1 | 6/2010 | Csomai | |
| 2010/0161589 A1* | 6/2010 | Nica | G06F 17/30442 707/713 |
| 2010/0179961 A1 | 7/2010 | Berry et al. | |
| 2010/0185643 A1 | 7/2010 | Rao et al. | |
| 2010/0198811 A1* | 8/2010 | Wiener et al. | 707/718 |
| 2010/0280983 A1 | 11/2010 | Cho et al. | |
| 2010/0306590 A1* | 12/2010 | Anand et al. | 714/32 |
| 2010/0318576 A1 | 12/2010 | Kim | |
| 2010/0332210 A1* | 12/2010 | Birdwell | G06F 17/30442 703/22 |
| 2011/0082688 A1 | 4/2011 | Kim | |
| 2011/0112921 A1 | 5/2011 | Kennewick et al. | |
| 2011/0130958 A1 | 6/2011 | Stahl et al. | |
| 2011/0153629 A1* | 6/2011 | Lehmann et al. | 707/758 |
| 2011/0175810 A1 | 6/2011 | Markovic et al. | |
| 2011/0167028 A1* | 7/2011 | Purang | G01C 21/343 706/45 |
| 2011/0191319 A1* | 8/2011 | Nie et al. | 707/706 |
| 2011/0231182 A1 | 9/2011 | Weider et al. | |
| 2011/0231188 A1 | 9/2011 | Kennewick et al. | |
| 2011/0279368 A1 | 11/2011 | Klein et al. | |
| 2011/0295722 A1 | 12/2011 | Reiesman | |
| 2011/0306426 A1 | 12/2011 | Novak et al. | |
| 2012/0016678 A1 | 1/2012 | Gruber et al. | |
| 2012/0022787 A1 | 1/2012 | LeBeau et al. | |
| 2012/0022872 A1 | 1/2012 | Gruber et al. | |
| 2012/0035932 A1 | 2/2012 | Jitkoff et al. | |
| 2012/0072413 A1* | 3/2012 | Castellanos et al. | 707/718 |
| 2012/0078837 A1 | 3/2012 | Bagchi | |
| 2012/0131020 A1 | 5/2012 | Nitz et al. | |
| 2012/0136649 A1 | 5/2012 | Freising et al. | |
| 2012/0150787 A1* | 6/2012 | Mital et al. | 706/47 |
| 2012/0151027 A1* | 6/2012 | Banks | H04L 12/6418 709/223 |
| 2012/0173464 A1 | 7/2012 | Tur et al. | |
| 2012/0239517 A1 | 9/2012 | Blondeau et al. | |
| 2012/0245944 A1 | 9/2012 | Gruber et al. | |
| 2012/0265528 A1 | 10/2012 | Gruber et al. | |
| 2012/0271676 A1 | 10/2012 | Aravamudan et al. | |
| 2012/0271946 A1 | 10/2012 | Choti et al. | |
| 2012/0311583 A1 | 12/2012 | Gruber et al. | |
| 2012/0317059 A1* | 12/2012 | Joshi | G06Q 10/06 706/12 |
| 2012/0322032 A1* | 12/2012 | Smith | G09B 19/0092 434/127 |
| 2013/0060766 A1* | 3/2013 | Lin | G06F 17/30259 707/723 |

(56) References Cited

U.S. PATENT DOCUMENTS

| | | |
|---|---|---|
| 2013/0095864 A1 | 4/2013 | Marovets |
| 2013/0110505 A1 | 5/2013 | Gruber et al. |
| 2013/0110515 A1 | 5/2013 | Guzzoni et al. |
| 2013/0110518 A1 | 5/2013 | Gruber et al. |
| 2013/0110519 A1 | 5/2013 | Cheyer et al. |
| 2013/0111348 A1 | 5/2013 | Gruber et al. |
| 2013/0115927 A1 | 5/2013 | Gruber et al. |
| 2013/0152092 A1 | 6/2013 | Yadgar |
| 2013/0185081 A1 | 7/2013 | Cheyer et al. |
| 2013/0218899 A1* | 8/2013 | Raghavan ......... G06F 17/30958 707/741 |
| 2013/0262361 A1 | 10/2013 | Attoyo et al. |
| 2013/0262449 A1 | 10/2013 | Arroyo et al. |
| 2013/0275164 A1 | 10/2013 | Gruber et al. |
| 2013/0290317 A1 | 10/2013 | Spivack |
| 2013/0304758 A1 | 11/2013 | Gruber et al. |
| 2013/0311997 A1 | 11/2013 | Gruber et al. |
| 2013/0332162 A1 | 12/2013 | Keen |
| 2013/0339005 A1 | 12/2013 | Zhang |
| 2014/0019435 A1* | 1/2014 | Ceri et al. ................. 707/712 |
| 2014/0025702 A1* | 1/2014 | Curtiss .................. G06Q 50/01 707/769 |
| 2014/0040387 A1 | 2/2014 | Spivack |
| 2014/0057232 A1 | 2/2014 | Wetmore et al. |
| 2014/0079297 A1 | 3/2014 | Tadayon et al. |
| 2014/0081626 A1 | 3/2014 | Chang |
| 2014/0081633 A1 | 3/2014 | Badaskar |
| 2014/0114952 A1* | 4/2014 | Robinson .......... G06F 17/30445 707/718 |
| 2014/0164476 A1 | 6/2014 | Thomson |
| 2014/0172756 A1 | 6/2014 | Clark |
| 2014/0222433 A1* | 8/2014 | Govrin .................. G06Q 40/02 704/260 |
| 2014/0250428 A1 | 9/2014 | Marks |
| 2014/0278343 A1 | 9/2014 | Tran |
| 2014/0278413 A1 | 9/2014 | Pitschel et al. |
| 2014/0280035 A1* | 9/2014 | Fraser ............... G06F 17/30463 707/718 |
| 2014/0310001 A1 | 10/2014 | Kalns et al. |
| 2014/0358889 A1 | 12/2014 | Shmiel |
| 2015/0066968 A1 | 3/2015 | Bastide |
| 2015/0081610 A1 | 3/2015 | Linehan |
| 2015/0088888 A1 | 3/2015 | Brennan |
| 2015/0095880 A1 | 4/2015 | Lee |
| 2015/0135160 A1 | 5/2015 | Gauvin et al. |
| 2015/0142704 A1 | 5/2015 | London |
| 2015/0149176 A1 | 5/2015 | Giulianelli |
| 2015/0205810 A1 | 7/2015 | Baker et al. |
| 2015/0348551 A1 | 12/2015 | Gruber et al. |
| 2015/0356057 A1 | 12/2015 | Subramanian |
| 2015/0356260 A1 | 12/2015 | D'Souza |
| 2016/0117593 A1 | 4/2016 | London |
| 2016/0132590 A1 | 5/2016 | Byron |
| 2016/0188578 A9 | 6/2016 | Nitz et al. |
| 2016/0188738 A1 | 6/2016 | Gruber et al. |
| 2017/0235848 A1* | 8/2017 | Van Dusen ....... G06F 17/30979 705/12 |

OTHER PUBLICATIONS

Liang Tang, An Intelligent Agent-based Self-evolving Maintenance and Operations Reasoning System, 2006, pp. 1-10. https://ieeexplore.ieee.org/stamp/stamp.jsp?tp=&arnumber=1656106 (Year: 2006).*

Alexander Huntemann, Probabilistic approach to recognize local navigation plans by fusing past driving information with a personalized user model, 2013, pp. 4378-4383. https://ieeexplore.ieee.org/stamp/stamp.jsp?tp=&arnumber=6631197 (Year: 2013).*

Pat Langley, Cognitive architectures: Research issues and challenges, 2009, pp. 141-160. https://www.sciencedirect.com/science/article/pii/S1389041708000557 (Year: 2009).*

International Search Report dated Oct. 15, 2014 in corresponding PCT Application No. PCT/US14/42893.

International Written Opinion dated Oct. 15, 2014 in corresponding PCT Application No. PCT/US14/42893.

International Search Report in corresponding PCT Application No. PCT/US2014051488 dated Nov. 14, 2014.

International Written Opinion in corresponding PCT Application No. PCT/US2014051488 dated Nov. 14, 2014.

International Search Report and Written Opinion for PCT/US2014/059841; dated Jan. 13, 2015; 7 pages.

Han et al., "Nlify: Lightweight Spoken Natural Language Interfaces via Exhaustive Paraphrasing." Proceedings of the 2013 ACM international joint conference on Pervasive and ubiquitous computing. ACM, 2013.

Snow et al., "Cheap and Fast—But is it Good?: Evaluating Non-Expert Annotations for Natural Language Tasks." Proceedings of the conference on empirical methods in natural language processing. Association for Computational Linguistics, 2008.

Guzzoni et al., "Active, a Platform for Building Intelligent Software." Computational Intelligence (2006).

"Karoui, Lobna, ""Intelligent Ontology Learning Based on Context: Answering Crucial Questions."" 2006 International Conference onComputational Inteligence for Modelling Control and Automation and International Conference on Intelligent Agents Web Technologies and International Commerce (CIMCA'06). IEEE, 2006."

Wursch et al., "Supporting Developers with Natural Language Queries." Proceedings of the 32nd ACM/IEEE International Conference on Software Engineering—vol. 1. ACM, 2010.

de Araujo et al., "Automatic Information Extraction from Texts with Inference and Linguistic Knowledge Acquisition Rules." Proceedings of the 2013 IEEE/WIC/ACM International Joint Conferences on Web Intelligence (WI) and Intelligent Agent Technologies (IAT)—vol. 3. IEEE Computer Society, 2013.

Maet al., "Concept Adjustment for Description Logics." Proceedings of the seventh international conference on Knowledge capture. ACM, 2013.

* cited by examiner

900

```
dialog/geo.dialog.6t x (Saved 19:34:06)
1  template (labelOne) {
2    pattern {
3      at (geo.CityName)
4    }
5    expression (city.name)
6  }
7
8  template (labelMany) {
9    pattern {
10     at (geo.CityName)
11   }
12   expression (city.names)
13 }
14
15 template (input) {
16   Pattern {
17     at (geo.GeoPoint)
18   }
19   expression ("at $ (value,latitude.value)" latitude, $ (value.longitude.value)" longitude")
20 }
21
22 template (paraphrase) {
23   pattern {
24     source (geo.CityRegion)
25     at (geo.CountryName)
26   }
27   pattern {
28     source (geo.StateRegion)
29     at (geo.CountryName)
30 }
```

902

```
dialog/stock.dialog.model.6t x
1  template (labelOne) {
2    pattern {
3      at (stock.Stockinfo)
4    }
5    expression (stock.data)
6  }
7
8  template (labelMany) {
9    pattern {
10     at (stock.Stockinfo)
11   }
12   expression (stock.datasheets)
13 }
```

*continued on next page*

FIG. 9

```
31  pattern {
32    source (geo.PostalRegion)
33    at (geo.CountryName)
34  }
35  pattern {
36    source (geo.CityRegion)
37    at (geo.StateName)
38  }
39  pattern {
40    source (geo.PostalRegion)
41    at (geo.StateName)
42  }
43  pattern {
44    source (geo.PostalRegion)
45    at (geo.CityName)
46  }
47  expression ("$ (this.made('labelMany')) with $(source.model('paraphrase'))")
48  }
49
50  template (paraphrase) {
51    pattern {
52      at (geo.GetCityRegionByName)
53    }
54    expression ("cities named $(input.city) (in $(input.state) (, $(input.country)))")
55  }
```

```
equiv/sample.equiv.6t (Saved 19:40:07) X
1 equivalence (biz.Business) {
2  and-maybe {
3   convertible-concepts
4    equivalent-values (name)
5    equivalent-values (address)
6  }
7 }
8
9 equivalence (food.Restaurant) {
10 and-maybe {
11  convertible-concepts
12    equivalent-values (name)
13    equivalent-values (address)
14  }
15 }
16
17 equivalence (food.Restaurant) {
18   fuzzy-string-equality {
19       trueTolerance(0.9)
20       uncertain.Tolerance(0.7)
21   }
22 }
23
24 equivalence (geo.GeoPoint) {
25  and {
26   fuzzy-numeric-equality(latitude) {
27       trueTolerance(0.00005)
28       uncertainTolerance(0.005)
29   }
30   fuzzy-numeric-equality(longitude) {
31       trueTolerance(0.005)
32       uncertainTolerance(0.005)
33   }
34  }
35 }
36
```

FIG. 10

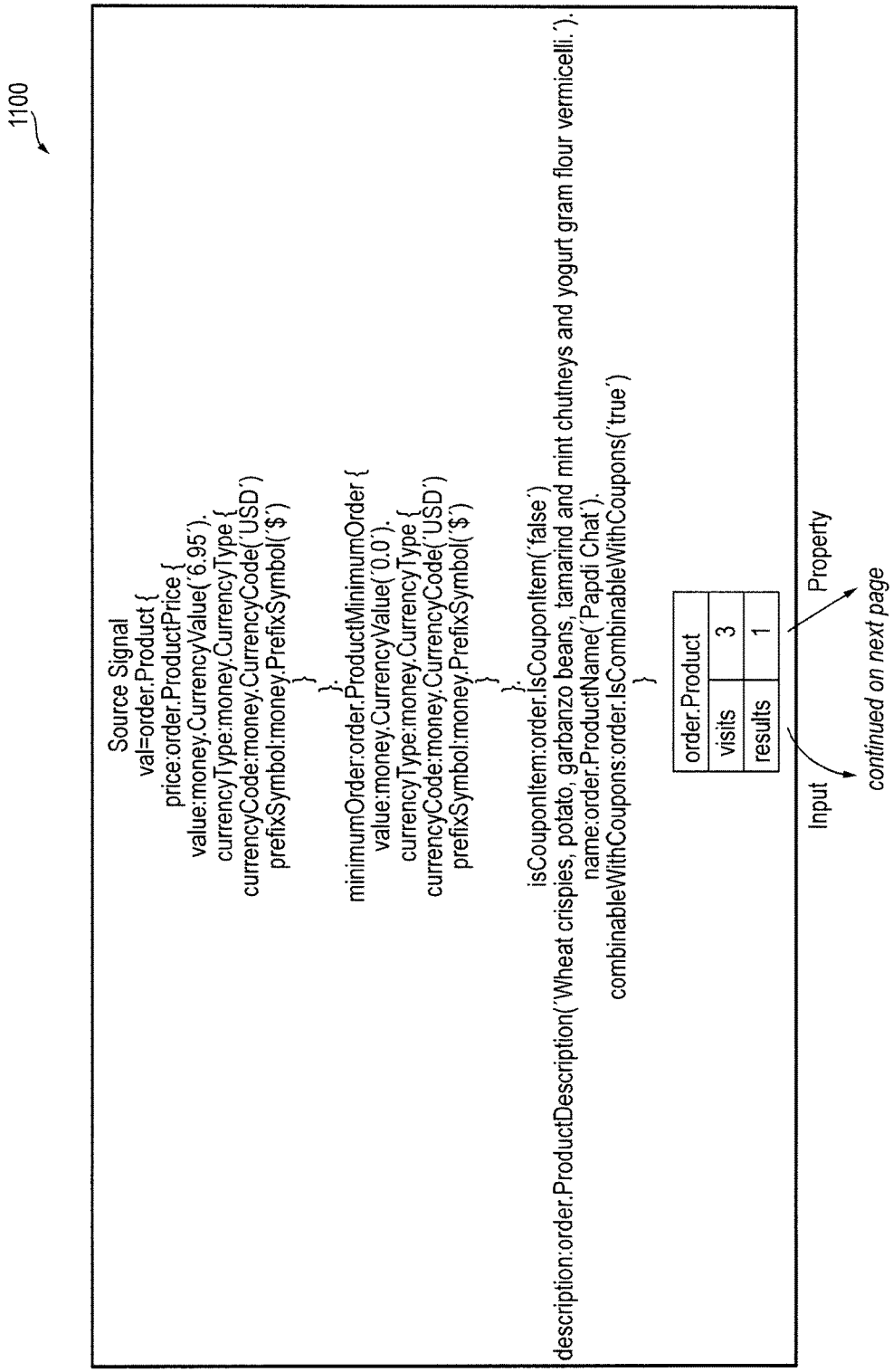

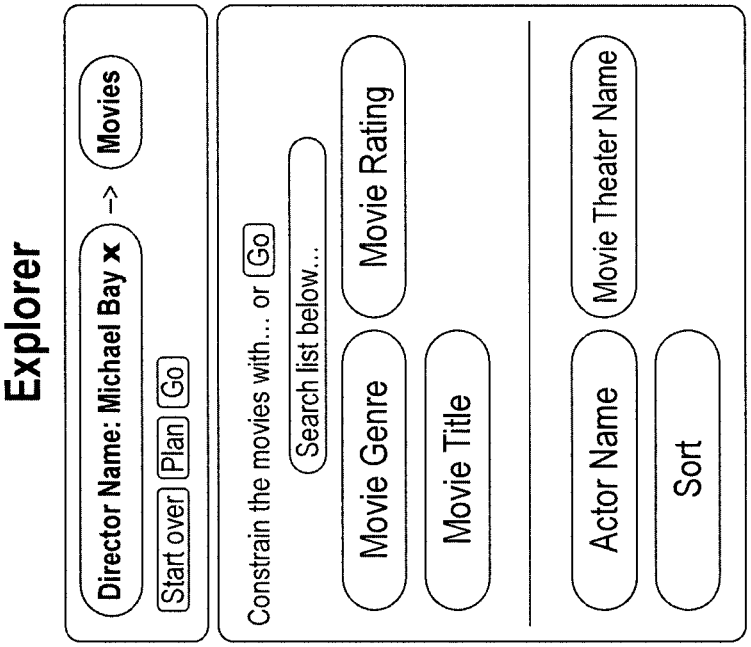
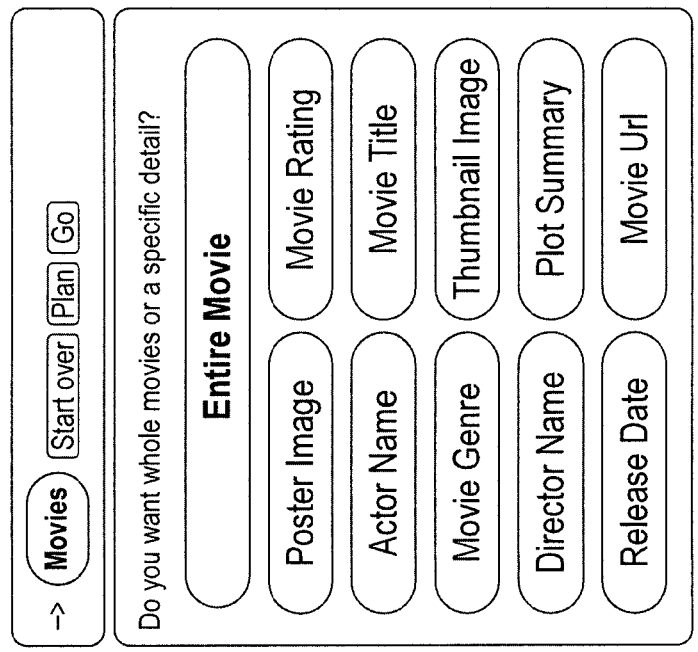
FIG. 14

DYNAMICALLY EVOLVING COGNITIVE ARCHITECTURE SYSTEM PLANNING

CLAIM OF PRIORITY

This application claims the benefit of U.S. Provisional Patent Application 61/837,354 entitled, A COGNITIVE ARCHITECTURE AND MARKETPLACE FOR DYNAMICALLY EVOLVING SYSTEMS by Bastea-Forte, et al., filed Jun. 20, 2013; U.S. Provisional Patent Application 61/888,907 entitled, INTERACTIVE COMPONENTS OF A COGNITIVE ARCHITECTURE FOR DYNAMICALLY EVOLVING SYSTEMS by Bastea-Forte, et al., filed Oct. 9, 2013; and U.S. Provisional Patent Application 61/917,541 entitled, QUALITY AND MARKETPLACE MECHANISMS FOR A COGNITIVE ARCHITECTURE FOR DYNAMICALLY EVOLVING SYSTEMS by Bastea-Forte, et al., filed Dec. 18, 2013, the entire contents of which are all incorporated herein by reference.

BACKGROUND

Some consumers and enterprises may desire functionality that is the result of combinations of services available on the World Wide Web or "in the cloud." Some applications on mobile devices and/or web sites offer combinations of third-party services to end users so that an end user's needs may be met by a combination of many services, thereby providing a unified experience that offers ease of use and highly variable functionality. Most of these software services are built with a specific purpose in mind. For example, an enterprise's product manager studies a target audience, formulates a set of use cases, and then works with a software engineering group to code logic and implement a service for the specified use cases. The enterprise pushes the resulting code package to a server where it remains unchanged until the next software release, serving up the designed functionality to its end user population.

BRIEF DESCRIPTION OF THE DRAWINGS

FIG. 9 illustrates a block diagram of example dialog templates for dynamically evolving cognitive architecture system planning, under an embodiment;

FIG. 10 illustrates a block diagram of an example description of an equivalence policy for dynamically evolving cognitive architecture system planning, under an embodiment;

FIG. 14 illustrates a block diagram of an example user interface for a dynamically evolving cognitive architecture system, under an embodiment.

DETAILED DESCRIPTION

Embodiments herein provide dynamically evolving cognitive architecture system planning. At a minimum, the system functions with two action objects and three concept objects. For example, the system forms an intent based on a user input and creates a plan based on that intent. The plan includes a first action object that transforms a first concept object associated with the intent into a second concept object. The plan further includes a second action object that transforms the second concept object into a third concept object associated with a goal of the intent. The first action object and the second action object are selected from multiple action objects. The system executes the plan, and outputs a value associated with the third concept object.

Figure 1:
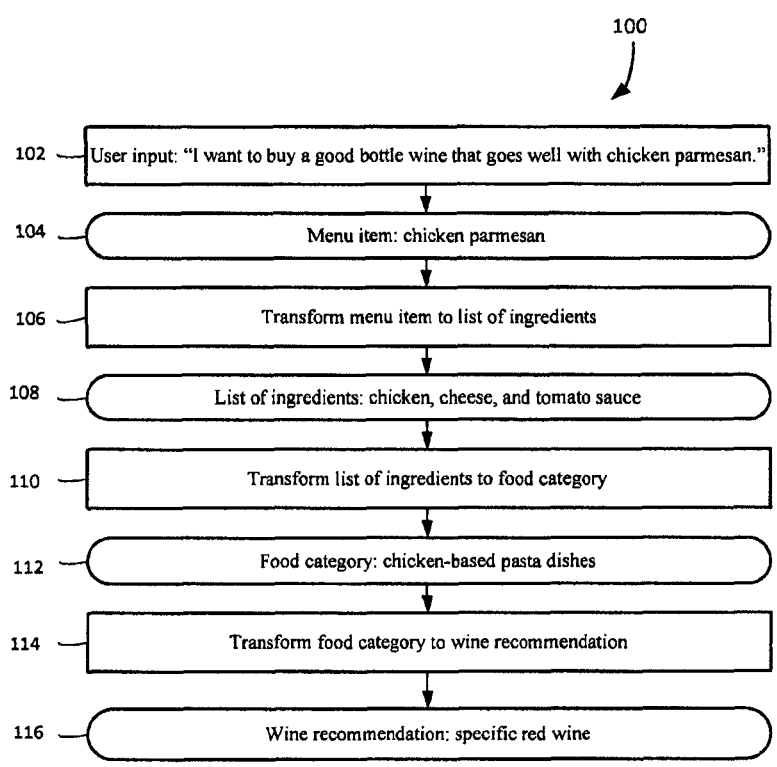
FIG. 1 illustrates a block diagram of an example plan created by a dynamically evolving cognitive architecture system, under an embodiment.

FIG. 1 illustrates a block diagram of an example plan 100 created by a dynamically evolving cognitive architecture system, in which action objects are represented by rectangles and concept objects are represented by ovals, under an embodiment. User input 102 indicates that a user inputs "I want to buy a good bottle wine that goes well with chicken parmesan" to the system. The system forms the intent of the user as seeking a wine recommendation based on a concept object 104 for a menu item, chicken parmesan. Since no single service provider offers such a use case, the system creates a plan based on the user's intent by selecting multiple action objects that may be executed sequentially to provide such a specific recommendation service. Action object 106 transforms the concept object 104 for a specific menu item, such as chicken parmesan, into a concept object 108 list of ingredients, such as chicken, cheese, and tomato sauce. Action object 110 transforms the list of ingredients concept object 108 into a concept object 112 for a food category, such as chicken-based pasta dishes. Action object 114 transforms the food category concept object 112 into a concept object 116 for a wine recommendation, such as a specific red wine, which the system outputs as a recommendation for pairing with chicken parmesan. Even though the system has not been intentionally designed to create wine recommendations based on the name of a menu item, the system is able to intelligently synthesize a way of creating such a recommendation based on the system's concept objects and action objects. Although FIG. 1 illustrates an example of a system creating a single plan with a linear sequence that includes three action objects and four concept objects, the system creates multiple plans each of which may include any combination of linear sequences, splits, joins, and iterative sorting loops, and any number of action objects and concept objects. Descriptions below of FIGS. 4, 5, and 6 offer examples of multiple non-linear plans with splits, joins, and other numbers of action objects and concept objects.

In a dynamically evolving cognitive architecture system, the full functionality is not known in advance and is not designed by any one developer of the system. While some use cases are actively intended by developers of the system, many other use cases are fulfilled by the system itself in response to novel user requests. In essence, the system effectively writes a program to solve an end user request. The system is continually taught by the world via third-party developers, the system knows more than it is taught, and the system learns autonomously every day by evaluating system behavior and observing usage patterns. Unlike traditionally deployed systems, which are fixed in functionality, a dynamically evolving cognitive architecture system is continually changed at runtime by a distributed set of third-party developers from self-interested enterprises around the globe. A third-party developer is a software developer entity that is independent of the dynamically evolving cognitive architecture system, independent of the end users of the dynamically evolving cognitive architecture system, and independent of other third-party developers.

Third-party developers provide the system with many types of objects through a set of tools, editors, and other mechanisms. These objects include concept objects that are structural definitions representing entities in the world. These objects also include action objects, which are similar to Application Programming Interfaces (APIs) or web service interfaces that define a set of concept object input dependencies, perform some computation or transaction, and return a set of zero or more resulting concept object values. These objects also include functions, which define specific logic that implement an action object interface created by a self-interested party, and monitors, which are specific types of action objects and associated functions that allow external services to keep track of the world, looking for certain conditions. Once the conditions become true, associated action objects are injected into the system for execution.

These objects additionally include tasks, for which a third-party developer specifies groupings of particular inference chains of action objects that make up an action object in a hierarchical way, and data, which provides instantiations of concept objects, such as product catalogs, business listings, contact records, and so forth. The objects further include linguistic data because there are many ways to interact with the system. Third-party developers may add new vocabulary, synonyms, and linguistic structures to the system that the system maps to concept objects and action objects to support the use case where natural language input is involved. The objects additionally include dialog and dialog templates provided by third-party developers, which contain all output strings and logic the system requires to communicate ideas back to the end user, either through visual interfaces or through eyes-free interfaces, and layout templates provided by third-party developers, which describe visually how the system presents information on a variety of devices. The objects may also include delight nuggets, which are domain oriented logic that enables the system to respond to situations in a way that surprises and delights an end user, providing additional information or suggestions that please and help the end user.

Third-party developers provide these new concepts, actions, data, monitors, and so forth to the system, in a self-interested way, with the intent of making available certain new capabilities with which an end user may interact. As each new capability is added to the system, an end user may access the new functionality and may do more than the end user was capable of doing before. The system knows more than it is taught, meaning that if a third-party developer adds ten new capabilities, the system will, through dynamic combinations of services, be able to do far more than ten new things. Given a request from an end user, the system, in a sense, writes automatic integration code that links individual capabilities into new dynamic plans that provide value for the end user.

Figure 2:
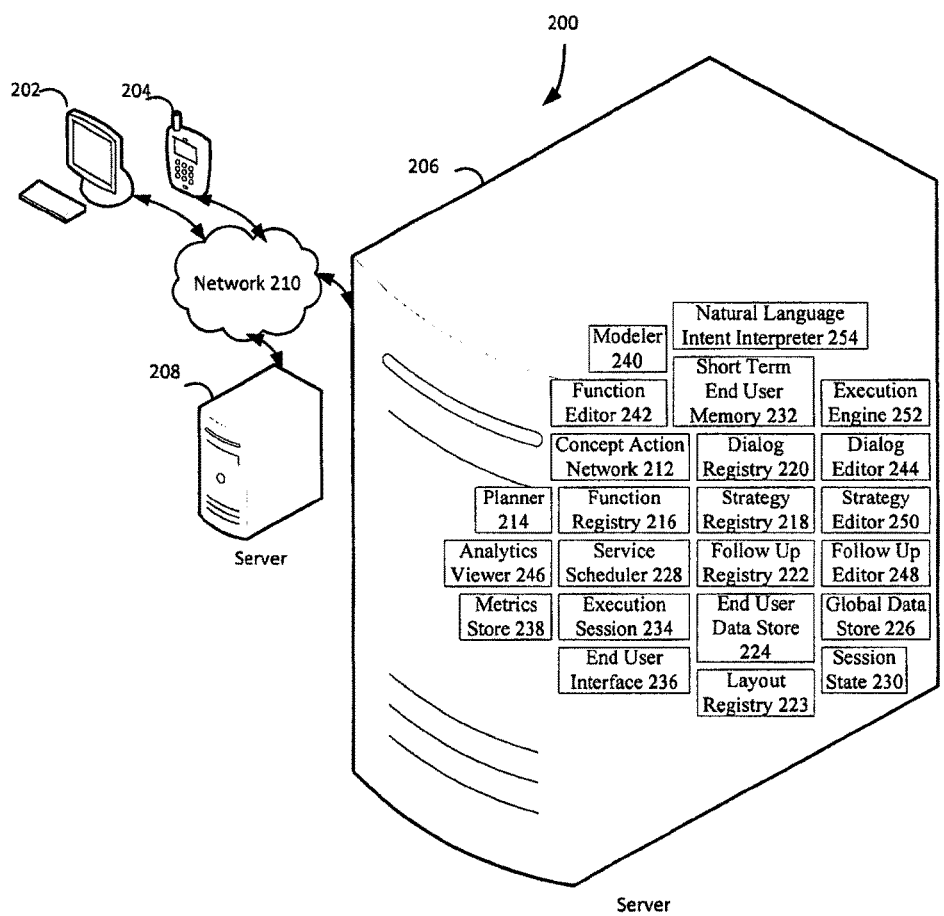
FIG. 2 illustrates a block diagram of an example dynamically evolving cognitive architecture system, under an embodiment.

FIG. 2 illustrates a block diagram of a dynamically evolving cognitive architecture system 200, under an embodiment. As shown in FIG. 2, the system 200 may illustrate a cloud computing environment in which data, applications, services, and other resources are stored and delivered through shared data-centers and appear as a single point of access for the end users. The system 200 may also represent any other type of distributed computer network environment in which servers control the storage and distribution of resources and services for different client users.

In an embodiment, the system 200 represents a cloud computing system that includes a first client 202, a second client 204, and a first server 206 and a second server 208 that may be provided by a hosting company. The clients 202-204 and the servers 206-208 communicate via a network 210. The first server 206 includes components 212-254 in an embodiment.

Although FIG. 2 depicts the system 200 with two clients 202-204, two servers 206-208, and one network 210, the system 200 may include any number of clients 202-204, any number of servers 206-208, and/or any number of networks 210. The clients 202-204 and the servers 206-208 may each be substantially similar to the system 1500 depicted in FIG. 15 and described below. FIG. 2 depicts the system components 212-254 residing completely on the first server 206, but the system components 212-254 may reside completely on the first server 206, completely on the second server 208, completely on the clients 202-204, completely on another server that is not depicted in FIG. 2, or in any combination of partially on the servers 206-208, partially on the clients 202-204, and partially on the other server.

One of the server components may include a concept action network 212. A concept action network 212 is the schema for the present capabilities and knowledge of the system 200, and a structured collection of known types fortified with atomic actions on those types. The concept action network 212 organizes and facilitates the interoperating execution of Internet enabled services, and may be represented as a mathematical graph with constraints defining its structure. Third-party developers may interact with the concept action network 212 by extending the concept action network 212 with new concept objects, new action objects, and newly implemented services. End users may interact with the concept action network 212 to accomplish end user tasks.

An Internet enabled service is a collection of functional interfaces to data retrievals, such as a local business search or querying a shopping cart, nontrivial computations, such as computing a symbolic integral, and real world actions, such as booking a reservation at a hotel or turning on a light in a smart enabled home. These functional interfaces are exposed to the public Internet via well-defined interfaces using standard protocols. When depicted as a mathematical graph, the concept action network 212 consists of nodes and edges. These nodes in a concept action network 212 include concept objects and action objects. A concept object is a model of a real world entity, such as a restaurant, or coupling thereof, such as a reservation, with a restaurant and a time. An action object is a model of an atomic unit of work that declares its external dependencies as input concept objects and produces a predetermined type of output concept object. The concept action network 212 may catalog similar Internet enabled services under a common schema, providing interoperability. The concept action network 212 may be depicted as a well-defined, strongly-typed mathematical graph structure that defines precisely a space of known capabilities.

The server 206 may also include a planner 214 component. When provided with an intent, a planner 214 produces a static plan of execution, which is a collection of input signals and a goal representing the semantics of an end user's desired task or step. A plan is a directed and acyclic coupling of concept action network nodes. Being directed and acyclic ensures that the plan is executable and that every step in the plan makes progress to the goal. Plans may include multiple instances of concept action network nodes, such as two distinct businesses in the case that one task includes, as a component, another task of finding the nearest coffee shop to the nearest movie theater. The planner 214 also revises plans when dynamic execution deems necessary.

The server 206 may include several registry components. A function registry 216 maps function values to action objects. Function values bundle declarative metadata about some action implementation with an invokable endpoint. A strategy registry 218 is a registry of selection strategies and instantiation strategies, both of which are used to satisfy the cardinality constraints of action inputs without bothering the end user. Strategies are keyed off the execution context in which they apply. A dialog registry 220 is a registry of dialog templates, keyed off the execution context in which they apply and guarded by additional dynamic context triggers. A follow up registry 222 is a registry of follow up plan intents/goals, used to suggest follow up actions to an end user under specific situations. Entries in the follow up registry 222 are also keyed off the execution context in which they apply and guarded by additional dynamic context triggers. A layout registry 223 stores third-party developer layout descriptions which the system 200 uses for rendering outputs based on concept object values to be rendered, such as the example of the wine recommendation described in FIG. 1.

An end user data store 224 is an end user specific storage of preferences and instrumented usage data, used to store both the raw data about decisions an end user makes and official/explicit preferences. A global data store 226 is a cross-user storage of default preferences and aggregate usage data that is updated in batches offline from end user specific data. A service scheduler 228 determines the order in which services will be called for a particular action invocation. The service scheduler 228 balances the cost and quality of each service to maximize precision and recall. A session state 230 is the state for a specific session of execution. A short term end user memory 232 is made up of recently completed plans and currently interrupted plans that are pending additional input.

An execution session 234 is a place for data, which is usually ephemeral, which an execution engine 252 uses. For example, as a plan executes the wine recommendation example in FIG. 1, the execution engine 252 stores the intermediate food classification concept object values in the execution session 234. An end user interface 236 is the user's view into the system 200 and associates an end user with an execution session. The end user interface 236 enables the end user's intent to be elicited at each step of interaction. A metrics store 238 is a data store housing all the raw, end user agnostic runtime data, such as service invocation attempts, successes, failures, latency, overhead, dialog selection counts and rendering overhead, end user request counts and overhead, and strategy selection counts and overhead, etc.

The server 206 will also include developer tools 240-250 in an embodiment. Developer tools 240-250 are a set of editors, debuggers, etc. that enable creation and updating of the data supporting the runtime environment. A modeler 240 creates and updates concept objects, such as updating primitive and structured types, and action objects, such as updating input/output/metadata schema definitions. A function editor 242 creates and updates provider specific implementations of action objects, which may involve writing some code in a sandboxed scripting language that may be partially generated and validated against action objects. A dialog editor 244 creates and updates dialog scripts that specify output messaging and logic for various aspects of the system 200, which, in an embodiment, involves a simple templating language with conditional code, variables, etc. An analytics viewer 246 provides insight into the data stored in the metrics store and generates reports, which may include things like performance time of various components over time, domain distribution of end user requests, and speed and success performance analytics for service providers, etc. A follow up editor 248 associates follow up goals with a contextual trigger in which the follow up goals should become active and recommended to an end user. A follow up trigger may evaluate the execution context that led to the current goal, user preferences, or environmental conditions. A strategy editor 250 writes instantiation strategies and selection strategies in a sandboxed scripting language and registers those strategies with the appropriate context in which they should be triggered.

In an embodiment, the server 206 will include the execution engine 252 that interacts with nearly all components of the dynamically evolving cognitive architecture system 200. For example, the execution engine 252 weaves together the end user intent with the planner 214, strategy registry 218, dialog registry 220, end user data store 224, function registry 226, and session state 230 to set up and complete tasks. The execution engine 252 also handles interrupted tasks and resumes interruptions when more data is elicited. The execution engine 252 is instrumented, which allows the execution engine 252 to collect dynamic data like end user preferences and the success rates of using particular services. When action object preconditions are not met, the execution engine 252 may dynamically adapt and/or interactively elicit feedback from an end user in order to continue with new information. Furthermore, the execution engine 252 intelligently schedules evaluation of services within the execution order semantics. When parallel or alternative paths exist in an executable plan, the execution engine 252 dynamically determines whether to proceed along one or more paths or whether to prompt for additional end user input before proceeding. These determinations are made from a variety of sources, including past result precision, recall, performance, and both global and local user feedback.

A natural language intent interpreter 254 provides a flexible platform for inferring intent structures from natural language queries. The natural language intent interpreter 254 allows the consideration of multiple sources of data, including, but not limited to, modeled vocabulary via exact and approximate language-agnostic matching, implicitly gathered usage data, such as popularity measurement, explicitly annotated training data via machine learning, and contextual data, for example an end user's current location. Additionally, the natural language intent interpreter 254 is dynamically reactive to both the upstream producers, such as speech recognizers, and downstream consumers, such as planners and executors, of its data.

Furthermore, the natural language intent interpreter 254 is a flexible framework for handling a deep vertical integration between the concept action network 212 and all producers and interpreters of natural language. Also, the natural language intent interpreter 254 acts as a conduit through which, for example, a normally "black box" speech recognizer may access concept action network level usage data or relationships to function more accurately. Similarly, the natural language intent interpreter 254 leverages concept action network level information through its clients, such as the planner 214, a downstream consumer of the natural language intent interpreter 254, to function more quickly and accurately. The planner 214, in turn, may access internal metadata from either the natural language intent interpreter 254 itself or its upstream producers, such as a speech recognizer. Speech recognition is facilitated by concept action network specific natural language models, which are in turn bolstered with data generated from concept action network specific planning algorithms, which are tuned and guided by dynamic execution data.

Figure 3:
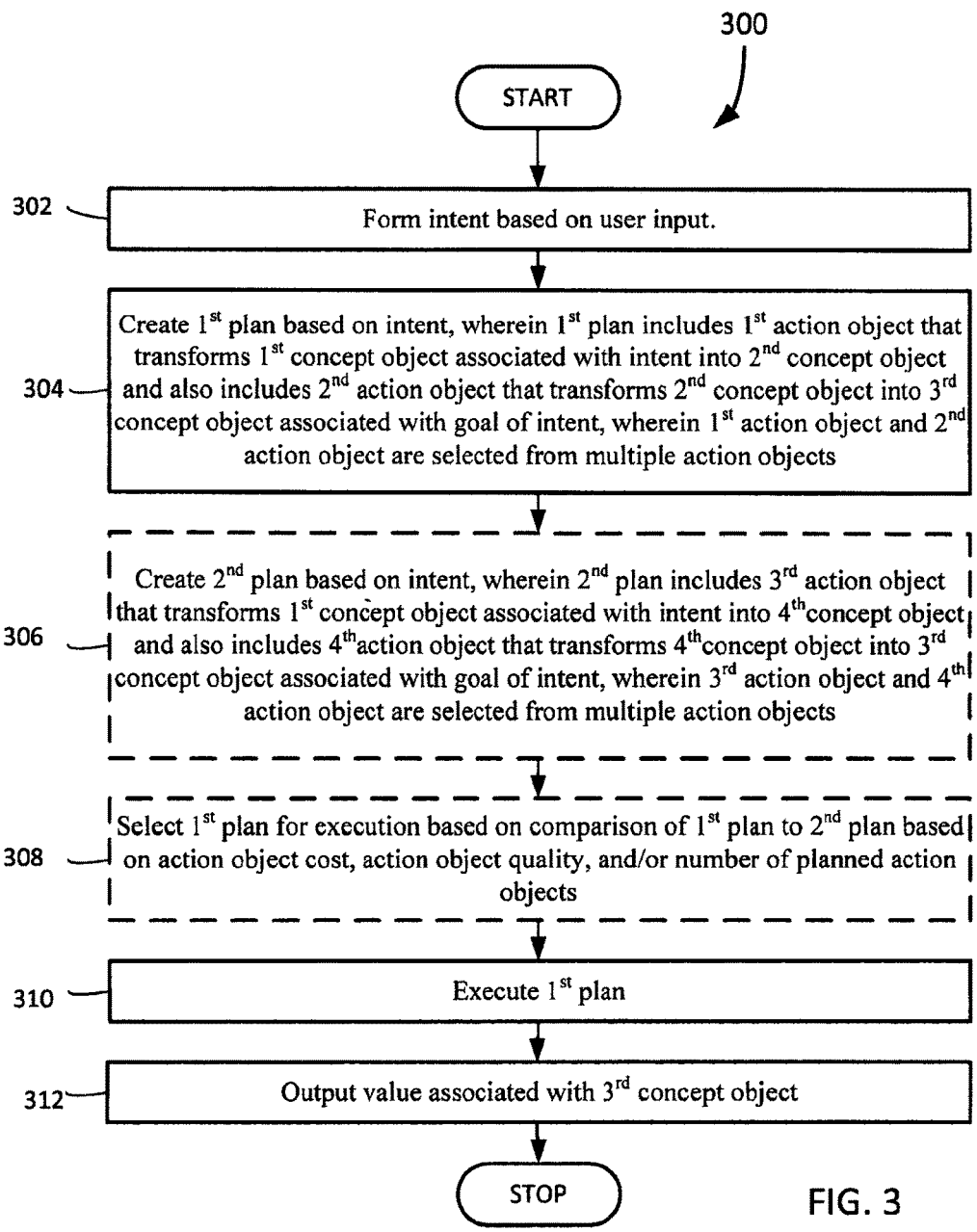
FIG. 3 is a flowchart that illustrates a method for dynamically evolving cognitive architecture system planning, under an embodiment.

FIG. 3 is a flowchart that illustrates a method for dynamically evolving cognitive architecture system planning, under an embodiment. Flowchart 300 illustrates method acts illustrated as flowchart blocks for certain steps involved in and/or between the clients 202-206 and/or the servers 206-208 of FIG. 2.

An intent is formed based on a user input, block 302. For example and without limitation, this may include the natural language intent interpreter 254 responding to a user saying "I want to buy a good bottle wine that goes well with chicken parmesan," by forming an intent as a wine recommendation based on the concept object 104 for a menu item, chicken parmesan. The concept action network 212 provides the ability to represent an end user query, or task specification, in a format amenable to automated reasoning and automated satisfaction/servicing. The concept action network 212 enables queries and tasks from potentially many input sources to be represented in a single mathematical structure that does not contain natural language or other potentially ambiguous constructs. Below is an example of an unambiguous intent expressed in terms of a concept action network 212.

```
1 intent {
2   goal:phone.PhoneCall
3   value:biz.BusineesCategory (Pharmacy)
4   value:biz.BusinessName(CVS)
5   value:geo.PostalCode (95112)
6 }
7
```

The system 200 forms intents from concept action network elements, such as concept objects and action objects, based on their significance to the task at hand, and these objects may be instantiated with known data values that may aid in accomplishing the task. The system 200 annotates intents as source signals and a goal, the collection of which form an intent. Signals are a formalization of "what user data does the user provide," and a goal is likewise a formalization of "what does the user want to accomplish." An intent is an unambiguous, mathematical representation of these formalizations. Forming the intent may include outputting dialog that requests an additional user input. For example, the system 200 may provide dialog to ask the user if the requested wine recommendation is for a wine that the user wants to drink after the wine is ordered and subsequently delivered or if the requested wine recommendation is for a wine that the user wants to purchase from a local supplier within a short driving distance and then drink the same day. Although this example describes the natural language intent interpreter 254 forming an intent based on a user input provided via speaking, the user input may not be based on natural language and the user input may be provided via any of multiple modalities, such as typed entry of text via a real or virtual keyboard, or similar substitutions, touch and mouse gestures, speech, and combinations of the above.

Given a concept action network 212 and an intent, the planner 214 may automatically reason about the existence of a sequence of concept action network prescribed steps that may service an intent. These steps of sequences produced by planning are denoted as plans, or programs for the concept action network 212 that, when executed with respect to the execution semantics, satisfies the goal within an end user's intent.

A first plan is created based on an intent, wherein the first plan includes a first action object that transforms a first concept object associated with the intent into a second concept object and also includes a second action object that transforms the second concept object into a third concept object associated with a goal of the intent. The first action object and the second action object are selected from multiple action objects, block 304. By way of example and without limitation, this may include the planner 214 creating a plan based on the intent by selecting the action objects 106, 110, and 114 from multiple action objects in the concept action network 212. The action object 106 transforms the concept object 104 for a specific menu item, such as chicken parmesan, into the concept object 108 for a list of ingredients, such as chicken, cheese, and tomato sauce. The action object 110 transforms the list of ingredients concept object 108 into the concept object 112 for a food category, such as chicken-based pasta dishes. The action object 114 transforms the food category concept object 112 into a concept object 116 for a wine recommendation, such as a specific red wine. The concept object 104 may include data which provides instantiations of a concept object for a specific menu item, such as chicken parmesan, the concept object 108 may include data which provides instantiations of a concept object for a list of ingredients, such as chicken, cheese, and tomato sauce, and the concept object 112 may include data which provides instantiations of a concept object for a food category, such as chicken-based pasta dishes. Forming the intent may associate user data in the user input with a concept object, such as associating the user saying "chicken parmesan" with the concept object 104 for a specific menu item, such as chicken parmesan. Different third-party developers may have provided each of the concept objects 104, 108, 112, and 116, and the action objects 106, 110, and 114 to the concept action network 210 because the system 200 provides interoperability between the objects 104-116.

A second plan is optionally created based on an intent, wherein the second plan includes a third action object that transforms a first concept object associated with an intent into a fourth concept object, and also includes a fourth action object that transforms the fourth concept object into the third concept object associated with a goal of the intent, wherein the third action object and the fourth action object are selected from multiple action objects, block 306. In embodiments, this may include the planner 214 creating another plan based on the same intent, wherein the other plan includes action objects selected from the multiple action objects in the concept action network 212 to sequentially transform the concept object 104 for a specific menu item, such as chicken parmesan, eventually into the concept object 116 for a wine recommendation, such as a specific red wine.

Given the likely case of the existence of an exponentially large number of feasible plans, the planner 214 may automatically identify the most efficient or desirable plan. The planner 214 may optimize plans using independently configurable metrics, including, such as plan size and plan execution cost, where cost may include notions of time, actual money required to invoke a service step, or fit with end user preference models. The system 200 may determine the simplest plan given an intent. The planner 214 efficiently enumerates the possible plans that satisfy an intent, defined as "includes steps that connect all signals to the given goal," and selects which plan best satisfies some criteria, defined as a mathematical objective function over plans. The definition of the objective function is independent of the planner 214. One instantiation of this objective function is "simplest plan", in which the planner 214 finds the plan with the fewest number of steps.

A first plan is optionally selected for execution based on comparison of a first plan to a second plan based on an action object cost, an action object quality, and/or a number of planned action objects, block 308. For example and without limitation, this may include the planner 214 selecting the plan for executing the action objects 106, 110, and 114 based on three planned action objects for the plan to execute the action objects 106, 110, and 114 and five planned action objects for the other plan. Given the likely case of the existence of an exponentially large number of these plans, the planner 214 identifies the most efficient or desirable plan.

A first plan is executed, block 310. By way of example and without limitation, this may include the execution engine 252 executing the plan to execute the action objects 106, 110, and 114 for recommending a wine for pairing with chicken parmesan, using the additional user input to identify a local supplier of the specific red wine. The execution engine 252 may execute a plan for recommending a wine for pairing with chicken parmesan based on an input parameter of an action object mapped to a web service parameter and a web service result mapped to an output value of the corresponding action object. Executing a plan may include using a user decision, a user preference, and/or user application contextual information to transform a concept object into another concept object. For example, the system 200 may identify a supplier of the specific red wine that is located geographically second closest to the user's current location as a favorite supplier of wine for the user based on previous purchases.

A value associated with a third concept object is output, block 312. In embodiments, this may include the system 200 outputting the name of a specific red wine which the system 200 outputs as a recommendation for pairing with chicken parmesan through a visual interface or through an eyes-free interface. The system 200 may select another action object from the concept action network 212 and execute the other action object to transform the concept object associated with the goal of the intent into another concept object. For example, the system 200 may also recommend purchasing the specific red wine from a local supplier that is the third closest geographically to the user because the third closest supplier is selling the specific red wine at a lower sales price than the sales price of the specific red wine at the suppliers that are closer geographically to the user. Another third-party developer may provide another action object after the system 200 forms the intent based on the user input and before the system 200 outputs the value associated with the third concept object, as the system 200 and the concept action network 212 evolve dynamically, without the need to stop providing services at runtime while being updated with additional service capabilities during the dynamic evolution.

Although FIG. 3 depicts the blocks 302-312 occurring in a specific order, the blocks 302-312 may occur in another order. In other implementations, each of the blocks 302-312 may also be executed in combination with other blocks and/or some blocks may be divided into a different set of blocks.

Figure 4:
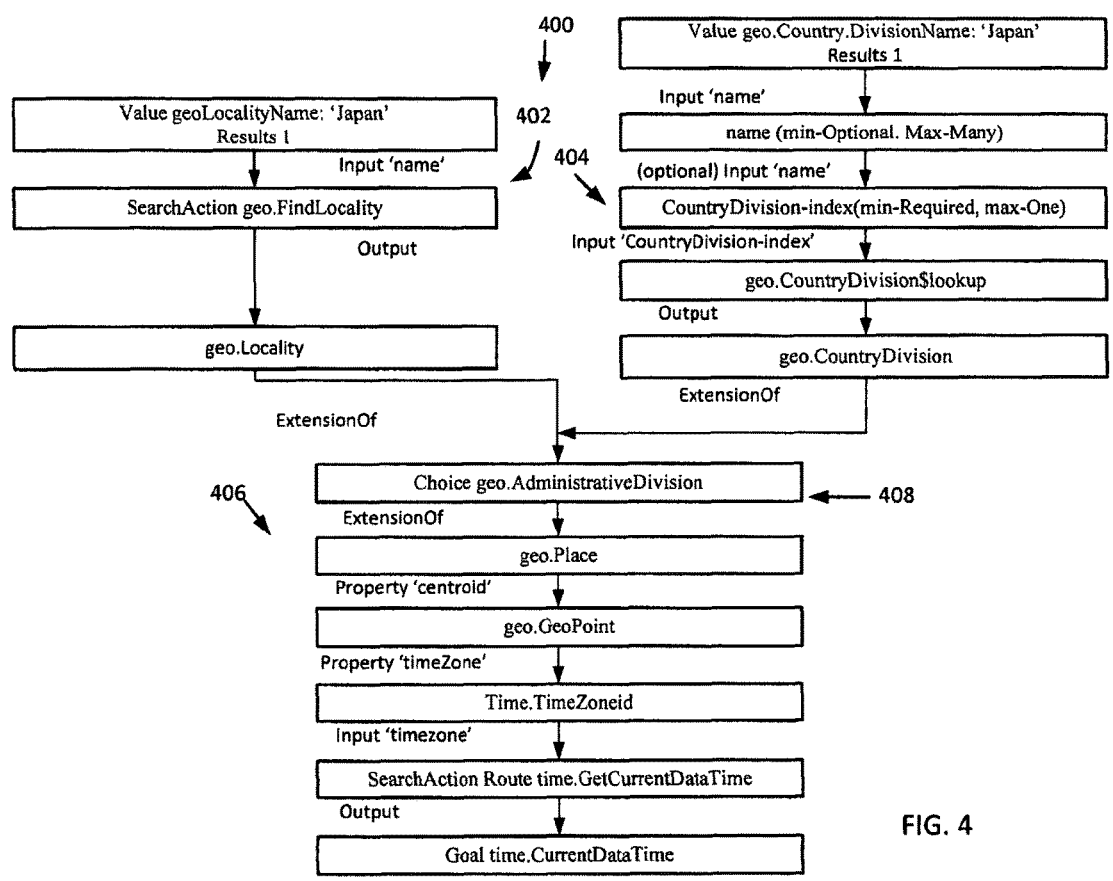
FIG. 4 illustrates a block diagram of an example plan for a dynamically evolving cognitive architecture system, under an embodiment.

FIG. 4 illustrates a block diagram of an example plan for a dynamically evolving cognitive architecture system, under an embodiment. In this example, the system 200 responds to a user saying "What time is it in Japan?" by creating the plan 400. The plan 400 includes a left branch 402, a right branch 404, and a central branch 406. The plan 400 represents an ambiguity based on the assumption that a third-party developer has taught the system 200 that "Japan" could be both the name of a country and the name of a city, which is called a locality in the general geographic model. Therefore, the planner 214 begins with two given source signals, both with concrete values of "Japan," but with two different types, city name and country name. The left branch 402 and the right branch 404 represent the resolution of the respective city and country source signals to a common resolved form, an AdministrativeDivision. The system 200 knows how to get a time zone from an AdministrativeDivision, from which the system 200 can query the current time. The static plan 400 represents an effort at unifying the source signals under a coherent plan that will achieve the goal. At runtime, the system 200 executes both the left branch 402 and the right branch 404, either serially or in parallel. When the values "join" at the AdministrativeDivision node 408 labeled "choice," the following three cases may occur. First, "Japan" is a city, and not a country, such that the system 200 selects the locality value without prompting the user and returns the time. Second, "Japan" is a country, and not a city, such that the system 200 selects the country value is selected without prompting the user and returns the time. Third, "Japan" is either both a city and a country, or more than one of either, such that the system 200 prompts the user to clarify. This process is subject to dynamic learning, whereby the system 200 "learns every day." As the system 200 is used, users will respond to prompts like this to inform the system 200, and the third-party developers by proxy, that "Japan" is not a city, or is rarely a city, and the system 200 subsequently adjusts its behavior. Although FIG. 4 illustrates an example of the system 200 creating a single plan with a joining sequence that includes a limited number of action objects and concept objects, the system 200 creates multiple plans each of which may include any combination of linear sequences, splits, joins, and iterative sorting loops, and any number of action objects and concept objects.

Figure 5:
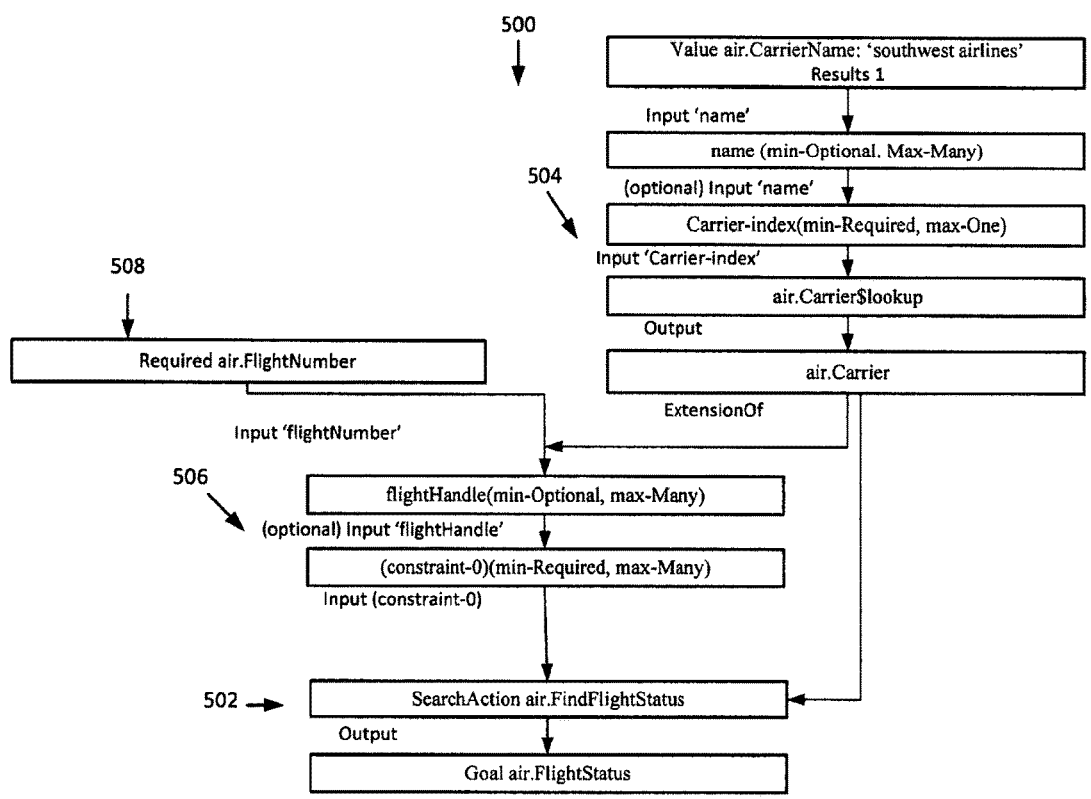
FIG. 5 illustrates a block diagram of another example plan for a dynamically evolving cognitive architecture system, under an embodiment

FIG. 5 illustrates a block diagram of another example plan for a dynamically evolving cognitive architecture system, under an embodiment. In this example, the system 200 responds to a user saying "Find Southwest flight status," by creating the plan 500. The plan 500 includes an action object 502, a right branch 504, a central branch 506, and an object 508. A third-party developer models the "FindFlightStatus" action object 502 to accept both a "flightHandle," which consists of a required FlightNumber and an optional carrier, and a carrier. The third-party developer indicates that the action object 502 can handle queries like "status of flight 501" and "status of united 501" without interrupting the user. However, the "Find Southwest flight status" query does not contain enough information because there are too many flights to reasonably query or present the results to the user, such that the system 200 must query the user for clarification. The right branch 504 involves a resolution to a carrier given its name, such as "southwest." Assuming that the right branch 504 succeeds, the system 200 uses a "split" with the carrier identification to both initiate the construction of a flight handle, in the central branch 506, and pass directly to the FindFlightStatus action object 502. The construction of the flightHandle follows what the third-party developer has prescribed, that it must contain a FlightNumber. When the system 200 cannot find a flight number, the system 200 inserts a placeholder in the "Required: air.FlightNumber" object 508, which will later induce the system 200 to prompt the user with, for example, "Which southwest airlines flight(s) would you like to check?" Although FIG. 5 illustrates an example of the system 200 creating a single plan with a join and a split, which includes a limited number of action objects and concept objects, the system 200 creates multiple plans each of which may include any combination of linear sequences, splits, joins, and iterative sorting loops, and any number of action objects and concept objects.

Figure 6:
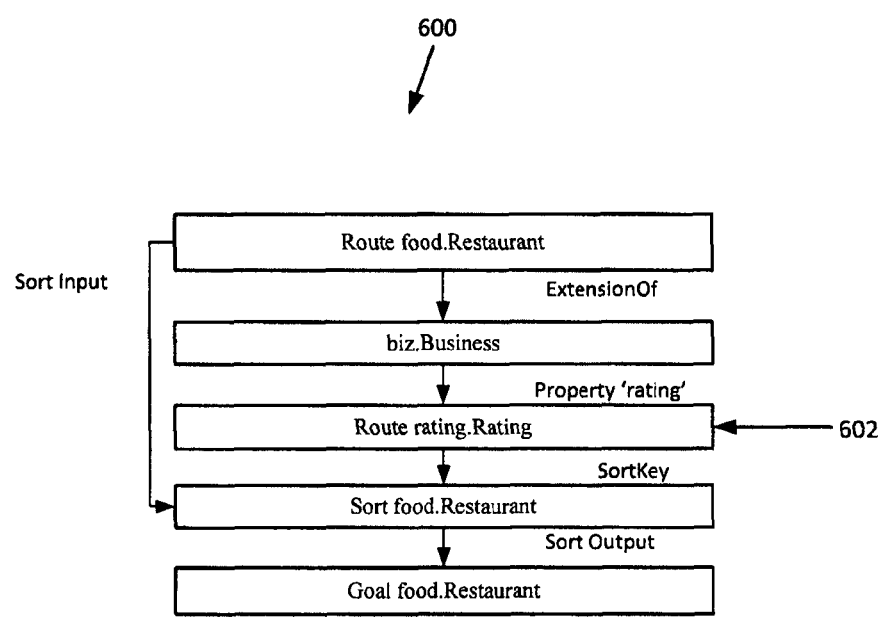
FIG. 6 illustrates a block diagram of yet another example plan for a dynamically evolving cognitive architecture system, under an embodiment

FIG. 6 illustrates a block diagram of an example plan for a dynamically evolving cognitive architecture system, under an embodiment. In this example, the system 200 responds to a user saying "Show the highly rated restaurants," by creating the plan 600. This example assumes to have a set of restaurants, perhaps from a prior result. The system 200 may cache user input data and system output data from a previous user request, and use the cached data as context for a subsequent user request. For example, the system 200 may cache user input data and system output data from a previous user request to find restaurants within a proximity of a shopping area that the user plans on visiting, and use the cached data as context for the subsequent user request for the highest rated of the identified restaurants. The system 200 transforms the user's intent of "highly rated" into a reference to the "rating.Rating" concept 602, with special platform-provided instructions to "sort by this." Although FIG. 6 illustrates an example of the system 200 creating a single plan with a iterative sorting loop that includes a limited number of action objects and concept objects, the system 200 creates multiple plans each of which may include any combination of linear sequences, splits, joins, and iterative sorting loops, and any number of action objects and concept objects.

Figure 7:
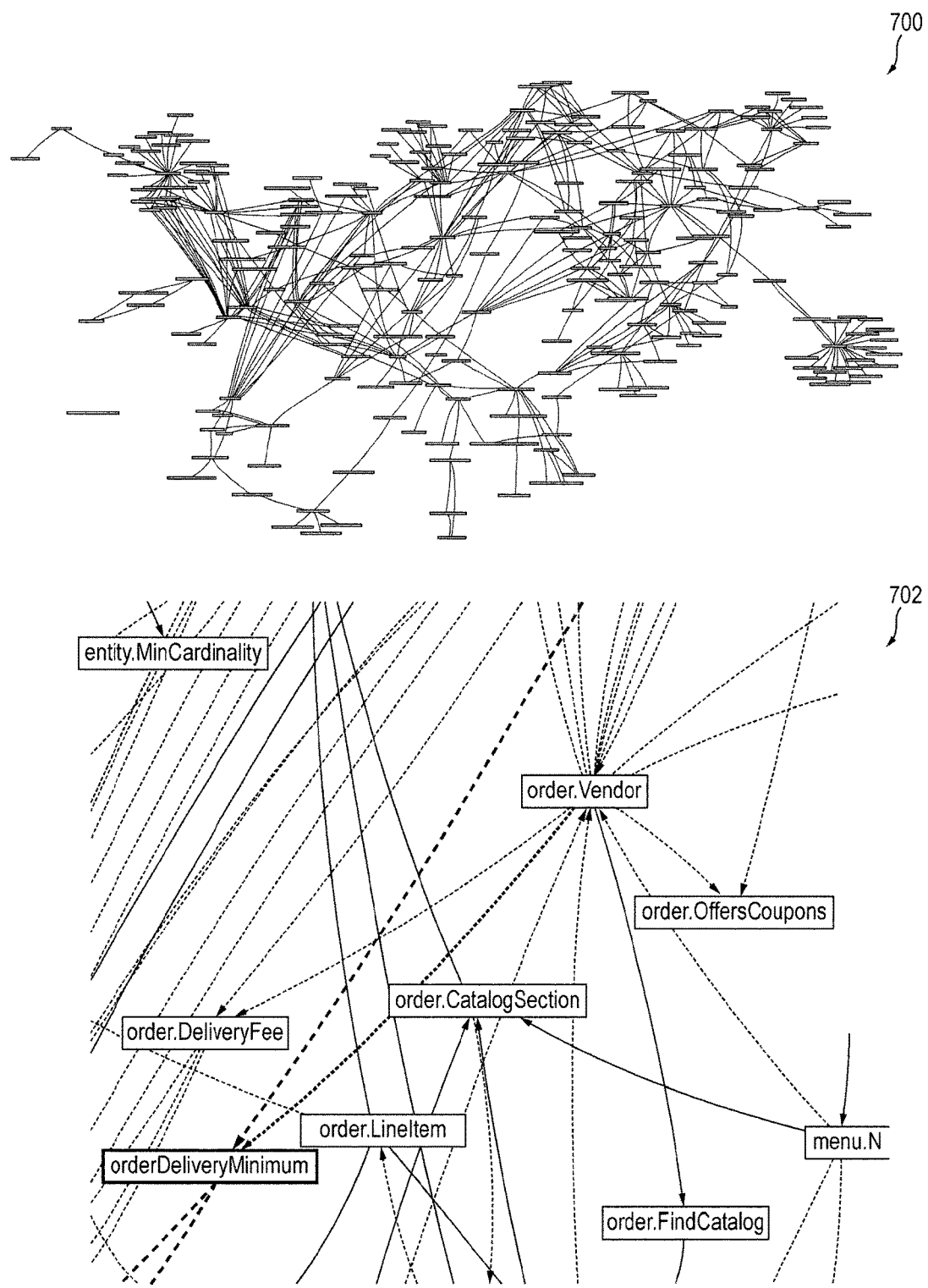
FIG. 7 illustrates a block diagram of an example of abstract representations of a small concept action network for dynamically evolving cognitive architecture system planning, under an embodiment.

FIG. 7 illustrates a block diagram of an example of abstract representations of a small concept action network for dynamically evolving cognitive architecture system planning, under an embodiment. Although the abstract representation 700 of a small concept action network includes about 300 objects, a real-life concept action network could include thousands or millions of objects. The detailed slice 702 of abstract representations of a small concept action network includes labels on concepts and actions and their relationships.

An extension is a strong relationship between concept objects corresponding to the classic "is a" relationship in computing and philosophy. Concept objects related by extension are expected to be substitutable. For example, if a restaurant extends a business, a restaurant is expected to have all of the components of a business and is expected to be able to be used anywhere a business is expected. Concept objects may extend more than one other concept object, as the concept action network 212 supports multiple inheritances.

A property is a strong relationship between concept objects that corresponds to the "has a" or containment relation. For example, a business (Business) has a property for its phone number (PhoneNumber). Properties may represent a one-to-many relationship, such as a business having multiple phone numbers, and these properties may carry cardinality restrictions.

Action-connection edges include inputs and outputs. Inputs connect concept objects, such as a "restaurant," to action object inputs, such as "BookReservation." Action object inputs are models of what an action object requires in order to execute properly. Action object outputs connect corresponding action objects to the concept objects corresponding to their output type, such as "reservation." Outputs represent what an action object produces when it executes as expected. The precise structure of the concept action network 212 acts as the central implementation point for many components of the system 200.

In some situations, the system 200 enables concept objects to be directly transformed into other concept objects without action objects. For example, if a "call" action object needs a PhoneNumber, and the planner 214 selects a business concept object, the planner 214 separates or selects the phone number component of the business concept object and feeds the phone number component to the "call" action object. The resulting sequence for this part of the plan is: beginning concept object, concept object component, action object and resulting concept object or business concept object, PhoneNumber concept object, Call action object and InProgressCall concept object. There are three main cases of concept object to concept object transformations without action objects, property projections, extensions, and contextualizations. Property projections include copying, or selecting, once piece of an existing concept object as another concept object, such as selecting a PhoneNumber concept object from a Business concept object. Extensions include treating a specific concept object as its more general form, such as treating a Restaurant concept object as a Business concept object. Contextualization includes treating a general concept object as a more specific form of concept object, such as assigning the role of ArrivalAirport to a generic instance of Airport. None of these transformations actually involve manipulation of data; they only prescribe viewing the concept object from a different perspective. The property, extension, and contextualization relationships are parts of the declarative declaration of a concept object, such that they are third-party contributions.

Figure 8:
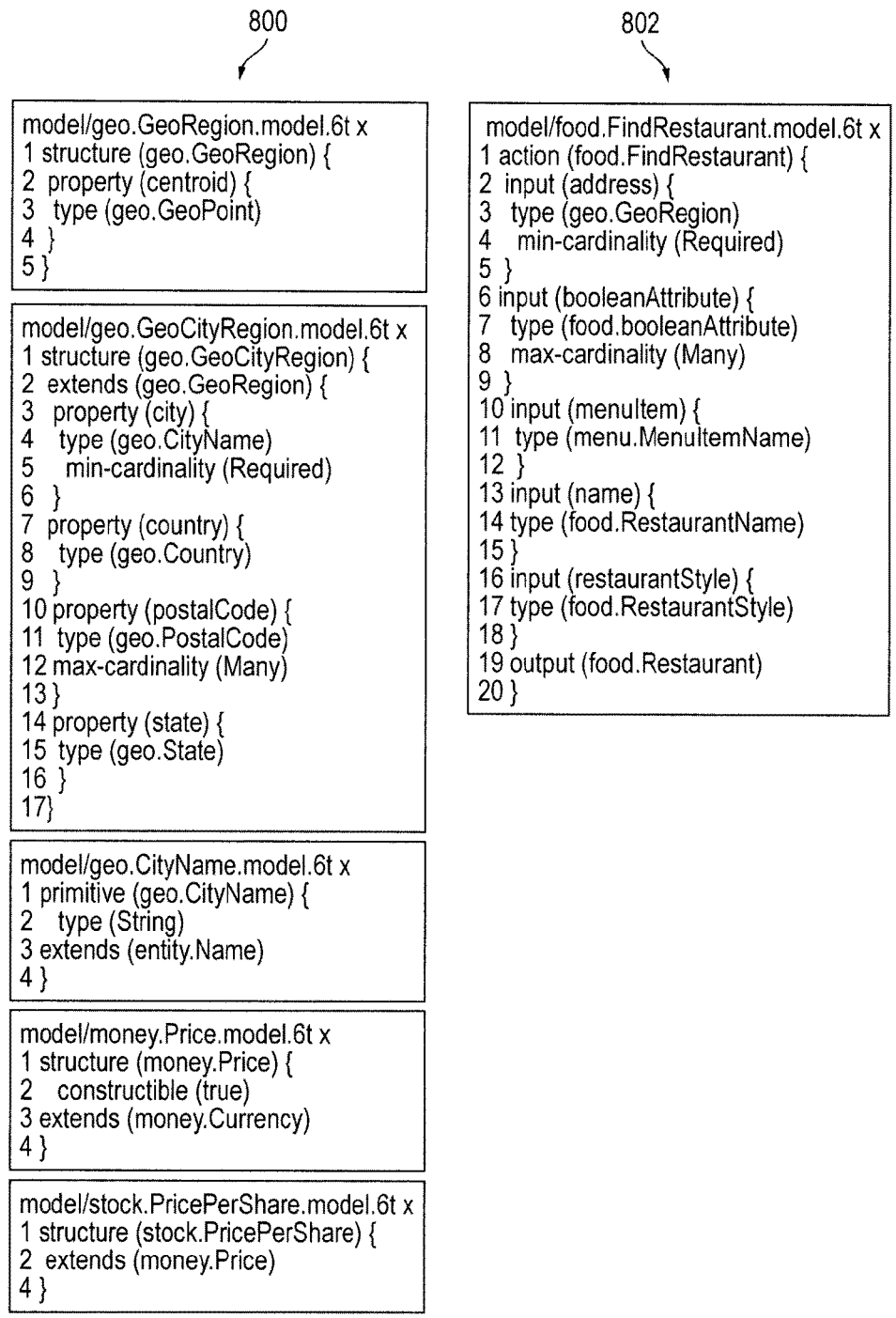
FIG. 8 illustrates a block diagram of example object representations for dynamically evolving cognitive architecture system planning, under an embodiment.

FIG. 8 illustrates a block diagram of example object representations for dynamically evolving cognitive architecture system planning according to an embodiment. Each of the objects in the concept action network 212 may be represented in a format using domain specific languages. The format may be declarative, rather than imperative, such as is typical with many programming languages. Third-party developers specify objects and contribute the objects to the shared concept action network 212. Each object may extend or reference other objects defined by the third-party developer community. Some examples of these formats include a type system for concept objects that allows a variety of aspects of a concept object to be declared, including type extension, properties, enumerations, etc., and a format for action objects that allows declaration of inputs and outputs and other aspects of an action object. Some other examples of these formats include a language for specifying formatting and rendering of data for display to an end user, a language for implementation of functions, and a language for describing executions that may occur based on input to achieve the output.

A third-party developer may edit these objects using conventional developer tools, such as code editors, or dedicated tools specifically built for editing the concept action network 212. Third-party developers may contribute code to a versioned object storage system that optionally supports collaborative development and may allow third-party developers to track versions of their code, as well as fork or merge changes from one set of objects to another, much as with standard revision control systems. The object representations 800 shows possible syntax for describing a few concept objects, which include primitive and structure types, with optional extensions and properties. The object representations 800 shows a sample action object, including inputs, input types, input constraints, and outputs.

FIG. 9 illustrates a block diagram of example dialog templates for dynamically evolving cognitive architecture system planning according to an embodiment. Another example of the formats using domain specific languages is a templating language for specification of language dialog that will be shown to an end user. The example dialog template 900 and 902 include patterns that indicate applicability of dialog expressions in different situations.

FIG. 10 illustrates a block diagram of an example description of an equivalence policy 1000 for dynamically evolving cognitive architecture system planning according to an embodiment. Yet another example of the formats using domain specific languages includes an equivalence specification language that allows declaration of when different concept values are equivalent. For example, two restaurants may be considered equivalent if their phone numbers are the same, so the language allows description of the identifying fields that determine equality or inequality. The example description of an equivalence policy 1000 indicates when businesses, restaurants, or geographic points may be considered equal, based on structural, string, or numeric equality.

Figure 11:
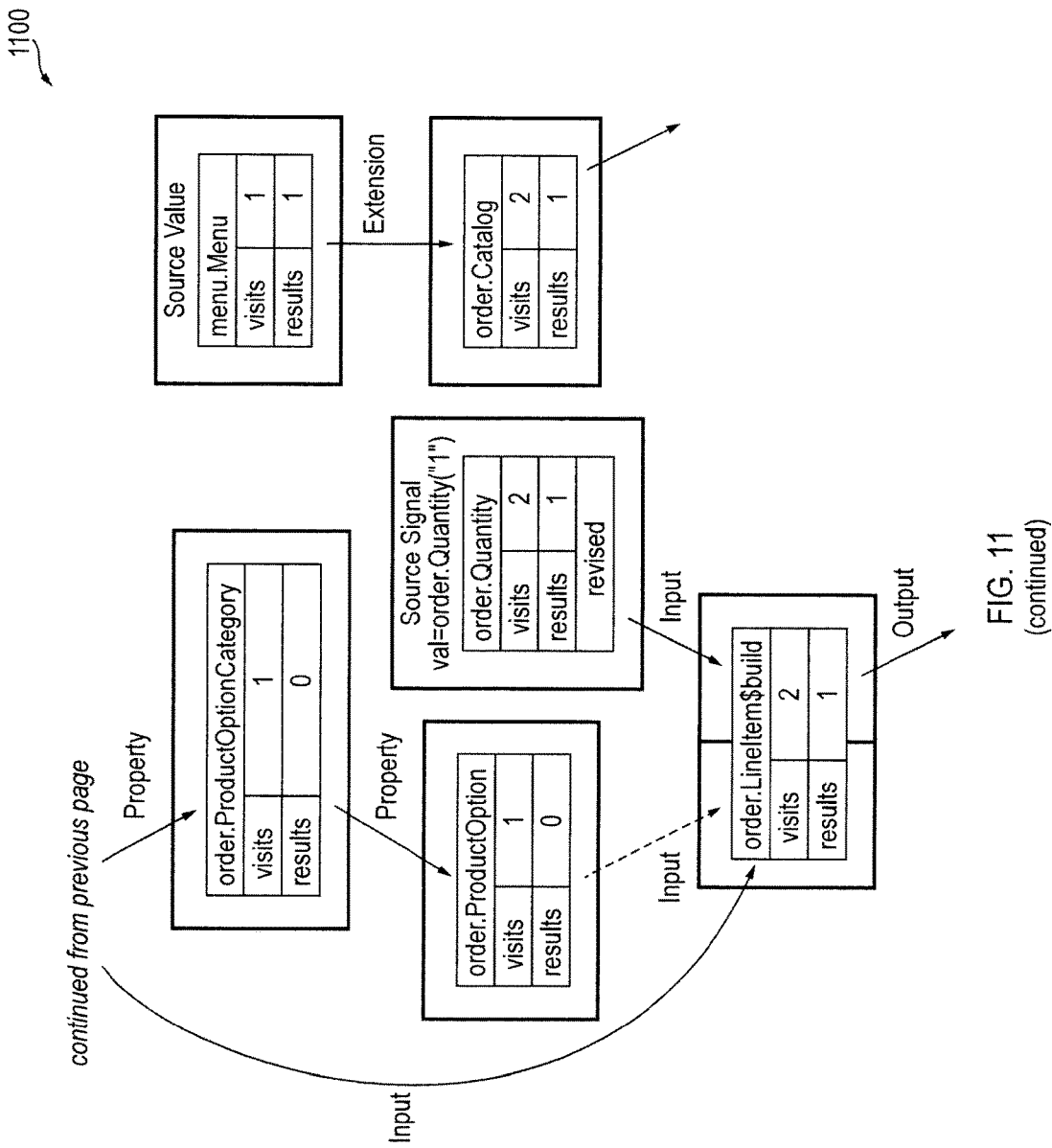
FIG. 11 illustrates a block diagram of example concept action network nodes and edges for dynamically evolving cognitive architecture system planning, under an embodiment.

FIG. 11 illustrates a block diagram of example concept action network nodes and edges 1100 for dynamically evolving cognitive architecture system planning according to an embodiment. The elements, such as nodes and edges, in the concept action network 212 map to well-defined semantics that allows an end user to use them. The process by which a node, such as an action object, is executed or evaluated corresponds to the invocation of a provider. For example, the execution semantics may prescribe: 1) the invocation of one or more Internet enabled services; 2) the manipulation of data returned by a service in a well-defined way; 3) the dynamic disambiguation of information, both implicitly from intermediate results and explicitly through end user input prompting; 4) the elicitation of additional information, such as credentials for a service; and 5) the interactive rendering of results produced at one or more nodes, starting and termination conditions and a well-defined execution order.

An example of an element of these semantics is the evaluation of a property edge. Property edges exist between concept objects and are interpreted as selective forms of data copying. The execution of a property edge involves selecting a component, or piece, of one concept object and copying it into another concept object. To execute a property edge between a concept object A and a concept object B, the execution engine 252 copies the component of the concept object A corresponding to the property associated with the edge from within the concept object A and instantiates the component in the slot reserved by the concept object B. The execution engine 252 may implement these semantics as server side software. The example concept action network nodes and edges 1100 are depicted during the process of execution by the execution engine 252.

The execution engine 252 implements execution of action objects via functions, which are also contributed by third-party developers. Functions are represented in a programming language or declarative form that enables a third-party developer to fully specify how an action object is implemented in terms of data manipulations, external web service calls, and so on. In the case where functions are implemented in a traditional imperative or functional programming language, concept action network functions may correspond to methods or functions in the programming language. Concept objects may be mapped to values within the programming language. The programming environment may also offer additional features to facilitate use of web services, threading, error handling, and returning of output values as concept object values and indications of concept object types via metadata, where resource management may be facilitated by the execution engine 252. In other cases, function executable code may be synthesized by a declarative description of the function's operation, such as the mapping of input parameters to web service parameters, and the mapping of web service results to output values. Based on this declarative description, the function may be run via an interpreter or compiled into executable code.

When data values are vended by multiple functions, declaratively modeled hierarchical equivalence policies may analyze values pairwise to determine whether the data values are equivalent, are not equivalent, or are of unknown equivalence. These equivalence policies may delegate to sub-policies or use a set of predefined predicates for primitive value comparisons.

During the course of execution, the execution engine 252 may annotate data sources with metadata to indicate their source. For example, provenance may include an end user who entered the data, the name of a service, foreign keys on a remote system, and the copyright data associated with a piece of information. As data flows throughout nodes during execution, the execution engine 252 tracks the provenance of the data so that the ultimate result contains representations or links to the full, combined set of sources that contributed to a result. This information may be made available to an end user in some user interfaces. The system 200 may also use the provenance data stylistically when rendering, and to indicate follow up actions.

In an embodiment, a preference library collects two types of preference data, end user explicit and end usage implicit. An example of end user explicit data is quick completion of regular order preferences, such as when an end user starts to order a sandwich and immediately seeing the autocomplete showing the exact type and condiments from previous orders such that the end user has a quick option to complete a full order as a shortcut for the same order as the order last time. Another example of end user explicit data is the recommendation of restaurants based on known food type preferences, such as when an end user either tags foods that the end user likes in the interface in the same way a "like" button works for social networks, or explicitly tells the system 200 about specific favorite food dishes so that the system 200 may use this information to locate restaurants serving variants of this food that are known either by menu data or mentions from reviews. End user explicit data may also include "things to do recommendations," such as when an end user clicks on a quick menu of options for favorite social, cultural or category based things the end user likes to do, and the system 200 then uses this data to recommend a set of preference matched events, local attractions or other candidate geographically relevant activities with a single click of a button. A further example of end user explicit data is travel preferences, such as when the system 200 collects all travel preference data and applies the data to relevant planning and booking, such as frequent flyer information, seat preferences, hotel amenities, such as extra pillows, ocean views or rooms with entertainment systems with kids games, and general such as "hotels with a spa," hotels "on the beach," on so on. This may include the system 200 prompting the user to determine the type of trip being planned, such as individual travel, for which the system 200 uses personal preferences, or a family based trip, such as when the kids are going, when it is a romantic trip, or when it is an adventure trip In an embodiment, end usage implicit data may include any items ever selected via a generic menu of options becoming an implicit favorite, any specifically requested item categorized and assigned as a favorite within that category, and any ordered item in understood categories considered a favorite, such as when an end user orders pizza, this data implies that the end user "likes" pizza. Another example of usage implicit data may be if an end user frequently reserves flights that leave in the morning hours during weekdays, the system 200 understands that the end user prefers morning flights during the week. Likewise, if an end user reserves the same restaurant over and over, the system 200 assumes that the end user "likes" this restaurant and subsequently recommends restaurants similar to this restaurant when the end user is in unfamiliar geographies. Similarly, if an end user is at a certain location for four nights in a row at 2:00 AM, the system 200 infers that the end user lives at that location or if an end user travels between point A in the morning to point B and back the same route in the evening many times, the system 200 infers that the end user works at point B.

Global learning is the confirmation of hypothesis by contextual user trends. The system 200 prompts an end user for a direction when an end user input may have multiple meanings. The system 200 reviews those disambiguation samples, examine the context, and learn what most people choose in order to avoid asking next time for similar inputs.

Figure 12:
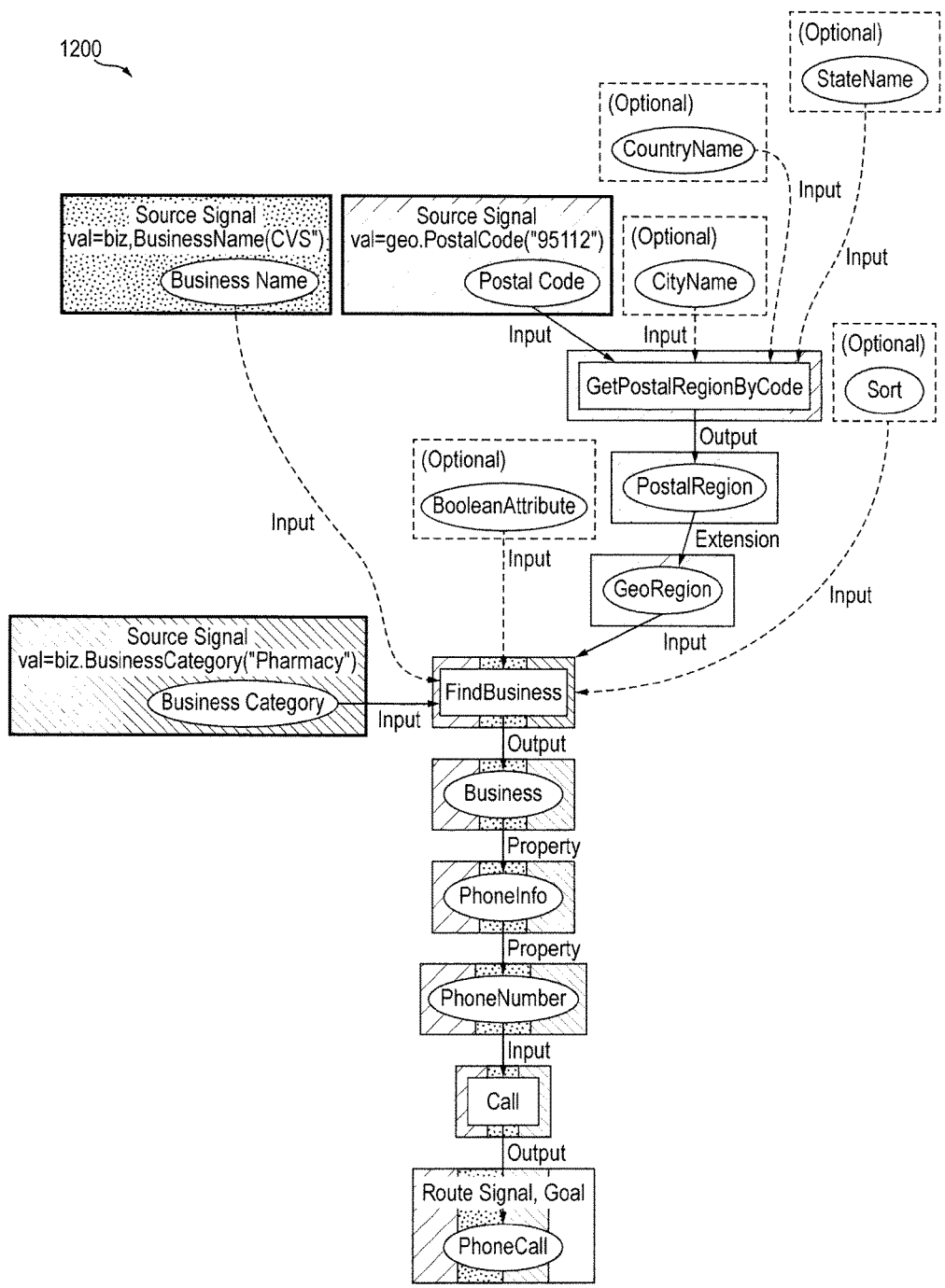
FIG. 12 illustrates a block diagram of an example plan for a dynamically evolving cognitive architecture system, under an embodiment.

FIG. 12 illustrates a block diagram of example plan 1200 for a dynamically evolving cognitive architecture system, under an embodiment. The planner 214 may start with a null plan, a disconnected graph consisting solely of the signals and the goal, and growing the null plan into a full executable plan. The planner 214 incrementally connects nodes in the null plan, the intentional nodes, pairwise with paths. The planner 214 may define these paths in advance, such as inferred from usage data or pre-computed via a shortest/simplest heuristic, or the planner 214 may learn the path online through the traversal of the graph structure of the concept action network 212. The planner 214 adds and removes paths as defined by a set of search parameters, including, for example, a limit on the total amount of computation performed. The addition of paths to a plan and the removal of paths from a plan effectively induces a search over a diverse sequence of plans, each of which the planner 214 evaluates for fitness via a configurable objective function. The planner 214 stores the current best plan. Should no one plan emerge as a clear optimum, the planner 214 stores a set of the current best plans and carries the set forward to the next step of the search. The example plan 1200 is the simplest plan that satisfies the previously formed intent.

Figure 13:
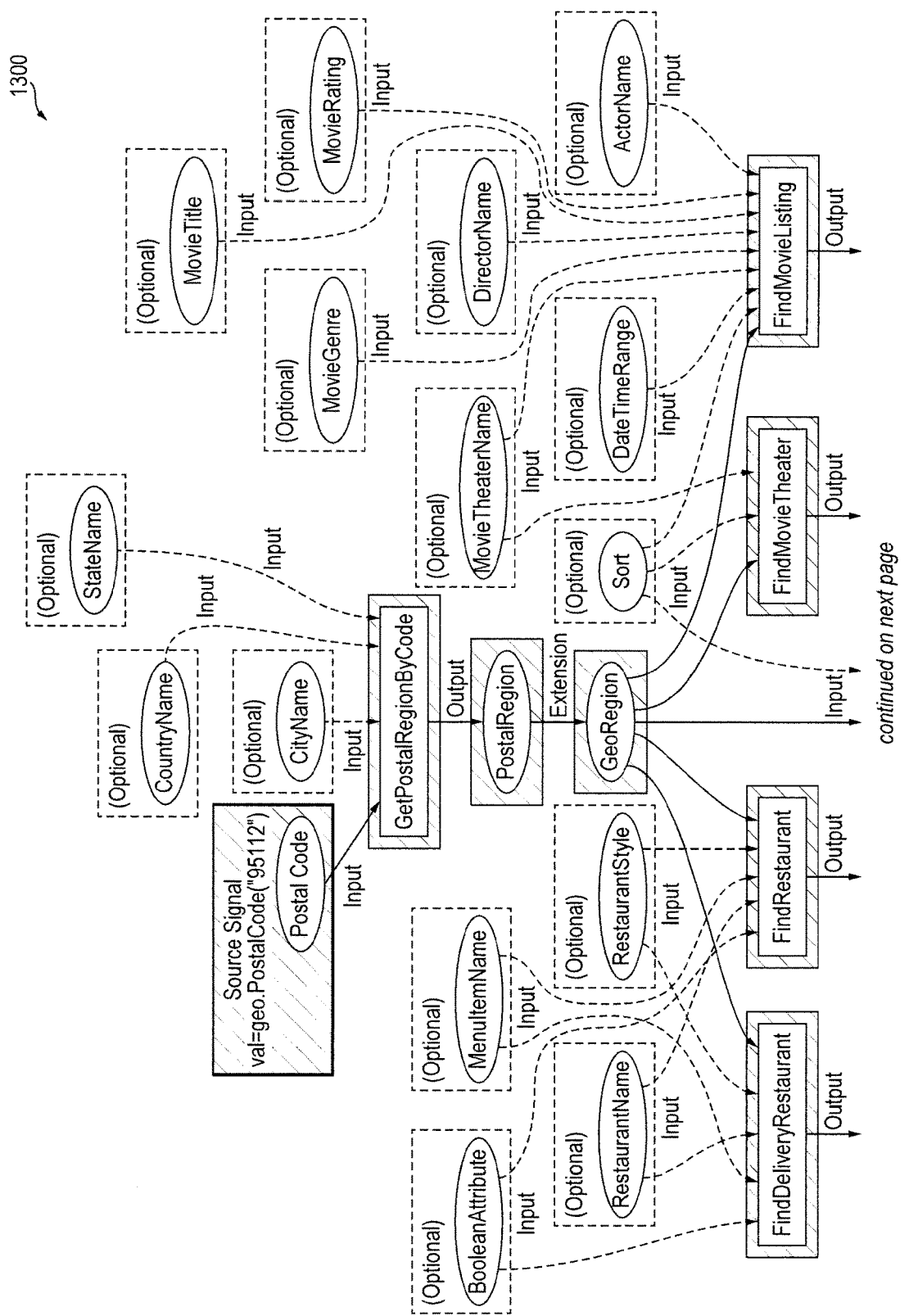
FIG. 13 illustrates a block diagram of another example plan for a dynamically evolving cognitive architecture system, under an embodiment.
Figure 13:
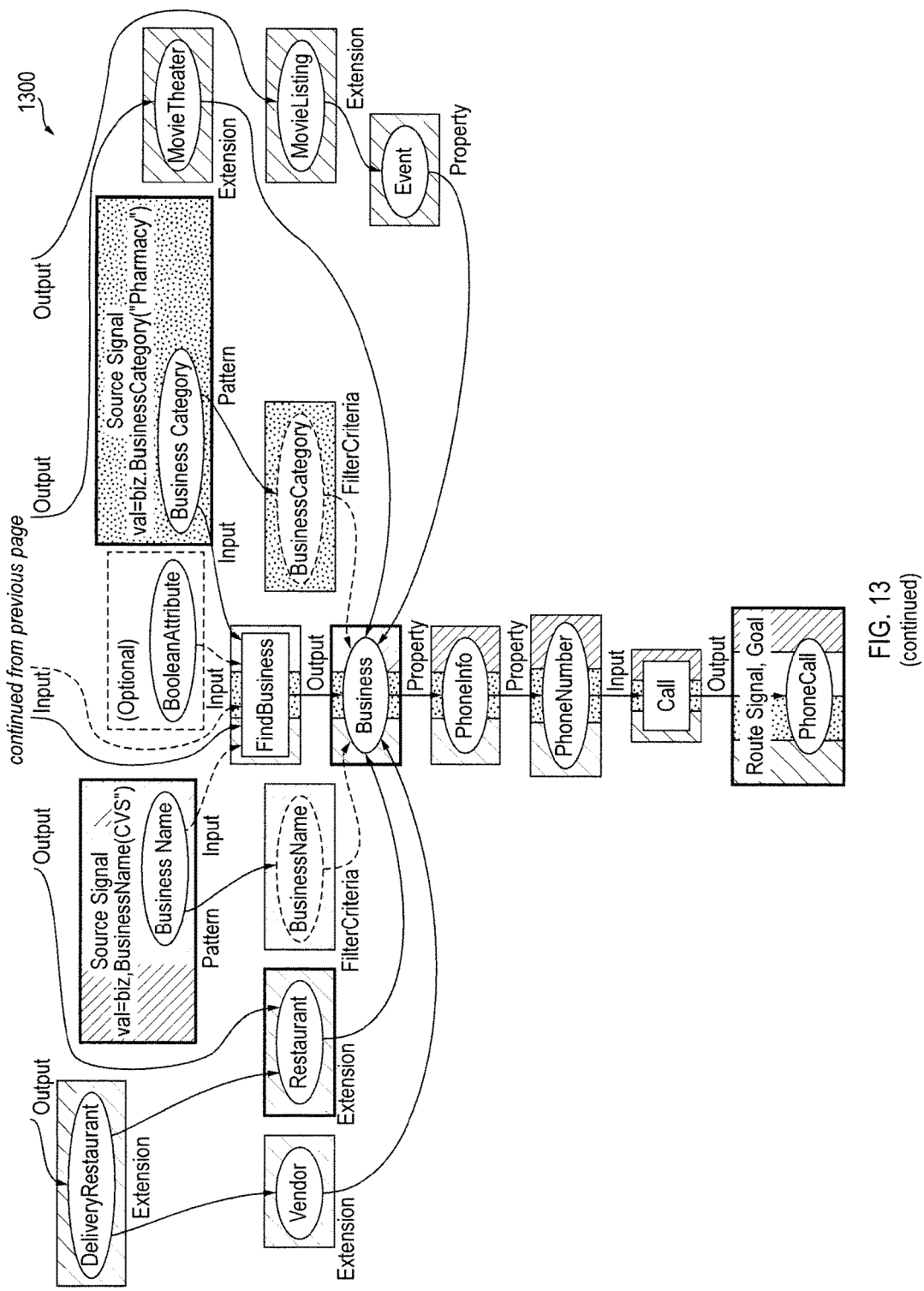

FIG. 13 illustrates a block diagram of example plan 1300 for a dynamically evolving cognitive architecture system according to an embodiment. The system 200 may determine the family of the N simplest plans, a generalization of the above. The system 200 provides alternative execution paths as contingency plans, and find and encode alternate interpretations, or multiple hypotheses, of an otherwise unambiguous intent structure. The example plan 1300 is a version of the plan 1200, but fortified with automatically generated contingencies and alternate interpretations. The system 200 may start with a known plan as an initial state, then, using, for example, a similar search procedure as before, connect the nodes in the plan with additional alternative paths until some totality condition is reached, such that that all possible alternative routes have been added.

FIG. 14 illustrates a block diagram of example Explorer user interface 1400 for a dynamically evolving cognitive architecture system according to an embodiment. The Explorer uses the concept action network 212 and the end user interface 236 to interactively elicit intent from an end user based on an action object graph. Since the system 200 dynamically extends the concept action network 212 at runtime, what an end user may say and do changes over time. The Explorer and the end user interface 236 enable an end user to form any intent representable by the concept action network 212 at the current time, and it forms the intent in a way that enables rapid construction of goals.

The system 200 shows not only obvious follow up possibilities, but longer-tail inputs that enable a rapid plan sketch to be entered, allowing the planner 214 to fill in all of the missing steps to the end goal. For example, an end user selects "phone call" as the first step, the planner 214 suggests "phone number" as a closely associated input possibility via the end user interface 236, which enables the end user to discover suggestions such as "menu item." These suggestions enable an end user to enter the plan sketch "lasagna—phone call" via the end user interface 236, and the planner 214 writes a sequence of steps that amount to "find someone who sells/has lasagna, and call that someone."

The Explorer UI elicits a goal from an end user, such as sorting suggested goals by relevance, prioritizing the output of actions. The Explorer UI may elicit a sub-goal, a property of the original requested goal—such as the name of a director name for a movie, from a user or continue with the original goal. The Explorer UI suggests signals by walking the concept action network graph from the goal via extensions and action objects and finding primitive inputs, without suggesting inputs that have already been selected and are not multi-cardinal. The Explorer UI repeats suggesting signals and finding primitive signals until an end user indicates a selection or until there are no more available signals. After an end user indicates their selection, the execution engine 252 executes the plan using the inputs and the goal. If the there is an interruption, the Explorer UI prompts for the interruption if the interrupted concept object is a primitive, otherwise the Explorer UI sets the goal to the interrupted concept object and begins suggesting signals and finding primitive signals. The example user interface 1400 elicits an intent structure centered around locating a movie.

Intent is not only possible from explicit indications, but may be inferred via integration with other mobile, touch, or window/desktop applications. All user interaction may be via multiple modalities, such as typed entry of text via a real or virtual keyboard, or similar substitutions, touch and mouse gestures, speech, and combinations of the above. Any entity within an end user application that is selected or represented may be starting points for interactions that involve a set of concept objects and action objects in the concept action network 212. Selection of pieces of information via an indication such as typing in a text box, having keyboard focus on a window or an object on screen, a mouse or touch gesture on a displayed object, or a natural language reference to an object may be used to select concept object values. An end user application may also represent contextual information, such as a document that is currently being edited, a geospatial location, contact information such as name, address or phone number, or any other piece of information offered to, stored, or elicited from an end user by an end user application. Such pieces of information may be referred to as cues.

Given a set of cues from an end user's use of an end user application, at any given point, the system 200 may link cues to corresponding concept action network objects or to intents in several ways. The system 200 may link cues or sets of cues to: 1) corresponding concept objects, action objects, renderings, or other information within the concept action network 212; 2) formal descriptions of intents; 3) natural language hints that may be used to describe intents; and 4) combinations of the above, such as a formally represented intent, combined with additional hints or inputs in natural language, and several additional concept objects corresponding to some of the cues.

For example, within any end user application that shows business listings, such as a touch-based map application, a web-based or mobile phone application restaurant review portal, or a search results page, an end user may select a business using appropriate modality, and then see business details. This selection allows integration with concept action network-based follow ups. In another example, while using a mapping application, an end user may ask "what are the hours of that African restaurant in Adams Morgan," the end user application, based on the context of the user looking at a map of that part of Washington, D.C., provides neighborhood restrictions on the lookup of restaurants, and the system 200 infers intent and provides execution. In addition, the mapping application may maintain references to concept object values for all objects on display, and provide those as cues directly to provide concept action network-based follow ups. In yet another example, on any representation of an object within an end user application, the end user application may offer contextual follow ups, such as menus, based on actions that correspond to actions and follow ups within the concept action network 212. Illustrating this example, an end user clicks on a calendar item, and sees a list or menu of additional actions for that calendar item, such as "invite others," "create social network invitation," etc.

The execution engine 252 may interact with an end user through dialog. Dialog is modeled declaratively and may consist of a string template of dialog content, possibly including dependent references to other dialog declarations or runtime values, the general phase of execution in which the template applies, such as before an action evaluation, accompanying a selection prompt, or at a successful result view, the specific execution context in which the template applies, such as a restaurant, the PhoneNumber projected from an EventVenue, and the GeoRegion constraint to the FindBusiness action, zero or more contextual conditions, such as input/output modality, time of day, location, user preferences, or previous usage history. The system 200 abstracts the details of selection and presentation from end users and third-party developers, taking into account past renderings, the active output modality, user preferences, and information coverage/gain, amongst other things.

The system 200 automatically renders concept object values, often taking the form of query results, with respect to declarative specifications. This automatic rendering is beneficial because it allows for different modalities, it requires third-party developers to think about the data model in a multimodal compatible manner, and it requires third-party developers to be explicit about relationships between data. The system 200 may mix and match different pieces of concept objects from different sources, such as injected layout exponential personal capabilities and presentation adaptive layout for mode, situation, and/or context. Automatically rendering concept object values with respect to declarative specifications enables the intelligent summarization of results, such as removing repeated data presenting the most relevant fragments of data, and enables intelligent, graceful degradation in the presence of bad/incomplete data to highlight contextual relevance. The system 200 may intelligently highlight results based on what an end user requested, such as highlighting selected pizza category restaurants, and enables provenance-aware rendering, such as highlighting branded data or merged data. Fully modeling the layout provides essential advantages. The system 200 structures data in a more linguistic manner and different representations of the same content support multiple platform and form factors.

The system 200 renders data based on statically typed structural data, such as concept objects, from the concept action network 212, as well as contextual information, such as the rendering modality and environment, user preferences, modeling details, including structural data about the concept objects, relative placement constraints, hints about importance of displaying different pieces of content or properties within concept objects, and the set of available templates or forms and other rendering data. The goal includes a plan for what to render and how to render it for a given modality. During a planning phase, the system 200 performs optimization over possible renderings to best fit a desired set of goals, which may be implemented by optimizing an objective function, and renders the goals based on constraints, relative placement, and/or templates.

Rendering layout may be performed server side, and optimized for lower latency, or higher quality of service, interactive use. The system 200 may minimize the amount of data sent to the clients 202-204 while still maintaining the original data structure on the first server 206 by pre-computing what data is shown to an end user in each frame. Interactive components may trigger a roundtrip to the first server 206, with the option of prefetching and pipelining the interactive responses. The system 200 implements learning-based prefetching based on an interactive user interface. By analyzing user interaction usage, the system 200 determines which interactive elements, or types of interactive elements, should be pre-fetched/pipelined to the clients 202-204 and in what order, which allows for the optimal balance. In an embodiment, the layout may be hierarchical, automatic, and template based. A set of templates may be designed to layout images, text, and buttons on a screen. These templates may have various priorities and hints assigned to text/button/ image regions. The system 200 automatically lays out concept objects without explicit layout information on the concept object itself by matching the appropriate concept priorities/hints to template priorities and hints.

In addition to displaying results in dedicated applications, such as a dedicated interactive user interface, the system 200 may embed results, dialog, and interactions with concept action network execution within end user applications wherever it may be useful for an end user. An interaction that begins from within an end user application may also display its results there. For example: the system 200 may overlay results on, combine results with, or interleave results with objects displayed in an existing end user application. The system 200 may display dialog or textual interactions within the same interaction patterns of an end user application. Examples include forms, dialog boxes, touch, keyboard or mouse-oriented menus, graphical placements of objects in visual positions, such as maps or charts, and stylistic elements such as making a contact or address appear in a certain format.

Since individual services are typically built by different third-party developers, a key challenge is to reconcile three goals, the easy integration of third-party services into the system 200 by third-party developers, a high level of interoperability between these services, and a high level of quality of services offered to end users. Historically, most approaches to such a challenge are to offer a platform where third-party developers contribute their services, and interoperability is possible via the platform. However, one challenge is that such platforms for integrating third-party services may only be successful when all stakeholders have incentives to use the platform cooperatively, so each participant receives desired benefits, end users have a rewarding experience, making use of the best service for each situation. Third-party developers are compensated for value they offer end users or other parties. Other contributors, such as data providers and end users who edit or contribute content, are also incentivized to help improve user experience. Advertisers may reach appropriate audiences effectively.

Mechanisms for building a marketplace of data and services are described in the context of a platform that supports the marketplace. For example, the platform may be the dynamically evolving cognitive architecture system 200 described above, or any other software framework that allows contributions of services and interoperability between these contributions. The platform offers a collaboratively extensible environment for description of data and interoperable services, built from objects and relations between objects, and uses services to handle requests. A platform may include software services hosted by third parties, which are not part of the platform, objects which include data types passed to and from services, operations that may be performed by the platform, user interface and dialog descriptions, cues for natural language processing, functions that are executable or declarative software code that implement operations, and that may access data or other services, and data, which may be any information stored by the platform and accessed by functions. A platform may also include developer tools, such as editors for objects, and mechanisms for data ingestion or upload, allow contributors to offer new functionality, and a shared, visible repository for the declarations of these objects. This may be a centralized or distributed storage system, such as a database. Contributors are people or organizations offering data, services, and/or objects for use in a platform. Advertisers are a type of contributor that may offer content for delivery to end users in exchange for compensation. Compensation to contributors may take many forms, including real or virtual currency, and/or other benefits, such as public recognition, and/or increased opportunities for use of a platform.

Invocation may be a single use of a function on behalf of an end user. For example, a platform runs executable software code on a specific input, possibly via remote services, such as looking up a city name from a postal code via a geocoding service. A request from an end user may be expressed as an intent to achieve a desired outcome that may be achieved by a combination of invocations. An object makes a contribution to the handling of a request if it is a function and it is invoked, or if it is another object and its definition is used to service a request. A visit is a view of a web page by an end user, or other form of digitally mediated user attention, such as an end user impression of an advertisement, or interaction with a widget or game. Traffic is quantitatively measured visits or contributions to services. Measurements may be in aggregate numbers of visits, level of engagement by an end user, or other more complex numeric representations of total contributions and visits.

The marketplace for services is a set of processes and technical mechanisms to encourage effective use of the platform. The processes and mechanisms are designed to achieve the goals of high quality of individual services, in terms of data quality and completeness, features, and any other aspects that affect end user experience. Another marketplace goal is interoperability with other services, so that contributors may derive benefits from others' contributed objects and data, both via explicit dependencies and via automated means supported by a platform. Other marketplace goals include software code reuse and consistency, so that contributors may do this with less software engineering effort, accurate indications of suitability, via metadata and dynamic measurements, so that a platform may accurately determine when services are suitable for a request, and performance, including low latency, low cost to serve requests, and other metrics.

The parties within a marketplace are the end users, a platform operator, and contributors of several types. The contributors may play several roles in the marketplace. Content application program interface providers desire branding, to sell advertising, and/or to sell access to restricted content. Data providers and data curators want recognition, payment for all content, and/or payment for enhanced or premium content. Transaction providers desire branding and transactions via selling of some good or service. Advertisers desire traffic from qualified end users. A single person or organization may play more than one of these roles.

A platform may offer technical mechanisms for handling an end user request and invoking and combining services to respond to it. A challenge of a marketplace is to select and prioritize the services that are used, so that goals of different parties are met. Selection relies on accurate accounting of service usage and contributions. A platform may be instrumented to maintain current information, such as contributions per contributor and per object and per group of objects, including invocation contexts, number of invocation times, implicitly and explicitly expressed end user experience metrics, and performance metrics.

Traffic management may include desired limits on whether a service or object may handle a request. For example, restrictions may be expressed by number of requests, by type of request, by rate, such as a number of requests per minute. In addition, these quotas may be expressed individually per end user, or for sets of end users. A traffic quota for an object is a representation of such desired traffic constraints for contributions from an object or service. A platform may provide mechanisms for enforcement of traffic quotas.

In many situations a platform may choose services to meet explicitly known constraints. These may include contractual goals on service use, in which specific contributors may have traffic or data driven constraints, such as number of requests per hour, or requests containing a specific keyword or involving a certain geographic region. A platform may use standard mechanisms to ensure execution meets specific contractual needs, such as using certain services, white labeling avoiding certain services, and packaging of dependent services. End user expressed approvals are approvals made by an end user, either in response to a request, or via a previous selection of a service via existing phone/social network applications, or via explicit preference over services or categories of services. Contributed services may be reviewed by a single reviewing authority, such as the platform operator, to determine if they meet desired goals for authority based approvals. Services may have provisional approval for specific traffic levels, or for specific periods of time, or be unconditionally approved for use at any level. A platform may directly use traffic management facilities to ensure these goals are met for explicit selection mechanisms.

Assuming a service meets explicitly specified restrictions, a platform may control traffic via implicit means, via a continuous process that begins by the assignment of initial traffic quotas via a policy. The automatic traffic control mechanism may maintain a set of current quotas which are enforced by a platform. Handling of requests may result in new analytics data, which a platform may use to update a set of current quotas. The initial quotas for services or objects may involve the speculative assignment of traffic based on initial indicators. A platform may dynamically rank objects and services according to the analytics provided by the platform, and dynamically adjust traffic quotas. Analytics signals that may contribute to traffic quota assignment include performance, including latency, automatically measured response quality, such as via known sentinel queries, or contributed test cases from contributors or users, precision/recall based on implicit user feedback, such as frequency of follow up queries, precision/recall based on explicit user feedback, such as a thumbs up or thumbs down selected by an end user in a user interface, after receiving a response, evaluations from human evaluators, such as from paid evaluators, or from other third party services, and proxy ranking off other indicators, such as a contributor's web domain ranking, or the ranking of that contributor's applications in an a publicly browsable app store.

A traffic assignment policy, whereby quotas are determined from these signals, may be fixed set of rules, or determined via more complex algorithms, including machine learning based approaches. A few other processes may supplement the processes described above, such as automatic reporting of analytics and ranking data in a forum for third-party developers, end users, and the public to peruse, and to offer recognition to exceptional contributions. Another process may be the curation of services and objects based on review/approvals for categories or services, and peer reviews/curation. Yet another process may include service tiers, in which a platform maintains metadata on all services and objects, so that different levels of stability are simultaneously available, such as bleeding edge, beta, and stable. End users may opt into the tier of their choice. Further processes may include promotion and discovery of services, such as end user facing features for discovery of available services based on suitability, intent elicitation from end user based on available services, and prioritization based on payment category of service, such as free, paid, freemium, etc.

A marketplace may support accounting and controls on all contributions from services and objects, enabling parties in the marketplace to enter into a variety of transactions: End users may pay to use services or objects, contributors may pay other contributors on which they depend, contributors may pay end users or other curators for help improving their services, contributors may pay the platform operator for operations of their services, and advertisers may pay the platform operator to obtain traffic or visits. In each of these cases, payment may be any form of compensation, immediately, or in the form of an agreement. Examples of end user transactions include free, but limited quantity or via promotion, purchase per request or by subscription, and freemium, for which limited features are free and premium features require a fee. The platform may charge contributors based on a variety of metrics, such as the number of objects contributed, the number of objects making contributions to end user requests, traffic levels, and the amount of data stored.

A platform operator may adjust traffic quotas based on a variety of compensation from advertisers. A key approach may be via bid and auction mechanisms using real or virtual currency. A platform may select bids via an auction mechanism, which may include ranking based on a variety of factors, including bid price, contributor, object, or group scores, user preferences, current situation, time of day, geographic location, current or upcoming calendar events, etc., and known preference history based on specific attributes, preferred services. Advertisers may bid for traffic that captures contextual moments that fall outside of traditional keyword matching sponsored links, such as hotels bidding to be the first choice offer for airline weather delays near airports, bars bidding to offer drink specials to 21-35 year olds in the vicinity with a Klout score over 55, restaurants bidding to offer drink/dinner specials to sports fans in the time, and location vicinity of large games or events. In another example, the platform may use a trusted personality algorithm to promote timely sponsored service suggestions based not only on intent inference but also using known preference history based on specific attributes, preferred services and context information such as time of day and location information. Offers may be filtered through probability of attractiveness filters and delivered via proactive suggestions from the assistant via dialog alert.

Figure 15:
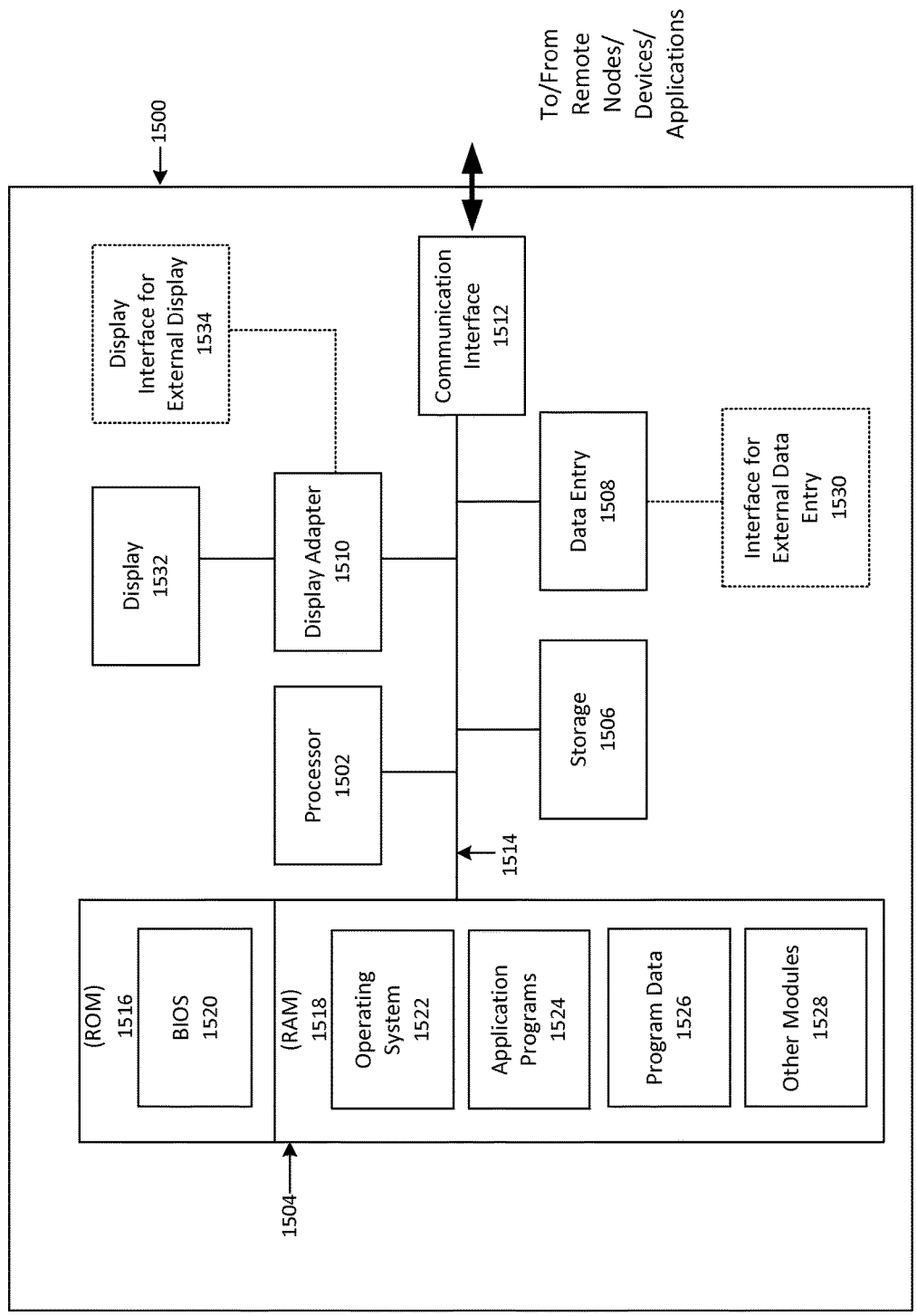
FIG. 15 is a block diagram illustrating an example hardware device in which the subject matter may be implemented.

An exemplary hardware device in which the subject matter may be implemented shall be described. Those of ordinary skill in the art will appreciate that the elements illustrated in FIG. 15 may vary depending on the system implementation. With reference to FIG. 15, an exemplary system for implementing the subject matter disclosed herein includes a hardware device 1500, including a processing unit 1502, a memory 1504, a storage 1506, a data entry module 1508, a display adapter 1510, a communication interface 1512, and a bus 1514 that couples elements 1504-1512 to the processing unit 1502.

The bus 1514 may comprise any type of bus architecture. Examples include a memory bus, a peripheral bus, a local bus, etc. The processing unit 1502 is an instruction execution machine, apparatus, or device and may comprise a microprocessor, a digital signal processor, a graphics processing unit, an application specific integrated circuit (ASIC), a field programmable gate array (FPGA), etc. The processing unit 1502 may be configured to execute program instructions stored in the memory 1504 and/or the storage 1506 and/or received via the data entry module 1508.

The memory 1504 may include a read only memory (ROM) 1516 and a random access memory (RAM) 1518. The memory 1504 may be configured to store program instructions and data during operation of the device 1500. In various embodiments, the memory 1504 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 1504 may also include nonvolatile memory technologies such as nonvolatile flash RAM (NVRAM) or ROM. In some embodiments, it is contemplated that the memory 1504 may include a combination of technologies such as the foregoing, as well as other technologies not specifically mentioned. When the subject matter is implemented in a computer system, a basic input/output system (BIOS) 1520, containing the basic routines that help to transfer information between elements within the computer system, such as during start-up, is stored in the ROM 1516.

The storage 1506 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 1500.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which may store data that is accessible by a computer, such as magnetic cassettes, flash memory cards, digital video disks, Bernoulli cartridges, RAM, ROM, and the like may also be used in the exemplary operating environment. As used here, a "computer-readable medium" may include one or more of any suitable media for storing the executable instructions of a computer program in one or more of an electronic, magnetic, optical, and electromagnetic format, such that the instruction execution machine, system, apparatus, or device may read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 1506, the ROM 1516 or the RAM 1518, including an operating system 1522, one or more applications programs 1524, program data 1526, and other program modules 1528. A user may enter commands and information into the hardware device 1500 through data entry module 1508. The data entry module 1508 may include mechanisms such as a keyboard, a touch screen, a pointing device, etc. Other external input devices (not shown) are connected to the hardware device 1500 via an external data entry interface 1530. By way of example and not limitation, external input devices may include a microphone, joystick, game pad, satellite dish, scanner, or the like. In some embodiments, external input devices may include video or audio input devices such as a video camera, a still camera, etc. The data entry module 1508 may be configured to receive input from one or more users of the device 1500 and to deliver such input to the processing unit 1502 and/or the memory 1504 via the bus 1514.

A display 1532 is also connected to the bus 1514 via the display adapter 1510. The display 1532 may be configured to display output of the device 1500 to one or more users. In some embodiments, a given device such as a touch screen, for example, may function as both the data entry module 1508 and the display 1532. External display devices may also be connected to the bus 1514 via the external display interface 1534. Other peripheral output devices, not shown, such as speakers and printers, may be connected to the hardware device 1500.

The hardware device 1500 may operate in a networked environment using logical connections to one or more remote nodes (not shown) via the communication interface 1512. The remote node may be another computer, a server, a router, a peer device or other common network node, and typically includes many or all of the elements described above relative to the hardware device 1500. The communication interface 1512 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 1512 may include logic configured to support direct memory access (DMA) transfers between the memory 1504 and other devices.

In a networked environment, program modules depicted relative to the hardware device 1500, or portions thereof, may be stored in a remote storage device, such as, for example, on a server. It will be appreciated that other hardware and/or software to establish a communications link between the hardware device 1500 and other devices may be used.

It should be understood that the arrangement of the hardware device 1500 illustrated in FIG. 15 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 1500.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 15.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the descriptions above, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in a context, it is not meant to be limiting as those of skill in the art will appreciate that various of the acts and operations described hereinafter may also be implemented in hardware.

To facilitate an understanding of the subject matter described above, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method for a dynamically evolving cognitive architecture system planning, the method comprising:
    forming an intent based on a user input using a natural language intent interpreter, the intent being associated with an input concept object;
    creating a first plan based on the intent, the first plan comprising a first input action object that transforms the input concept object into an intermediate concept object and a first output action object that transforms another intermediate concept object into an output concept object associated with a goal of the intent, the other intermediate concept object comprising one of a same object as the intermediate concept object and a different object from the intermediate concept object, the first input action object and the first output action object being selected from a plurality of action objects;
    creating a second plan based on the intent, wherein the second plan comprises a second input action object that transforms the input concept object into an alternative intermediate concept object and a second output action object that transforms another alternative intermediate concept object into the output concept object associated with the goal of the intent, the other alternative intermediate concept object comprising one of a same object as the alternative intermediate concept object and a different object from the alternative intermediate concept object, the second input action object and the second output action object being selected from the plurality of action objects;
    comparing the first plan with the second plan, the first plan and the second plan each having an action object cost, an action quality cost, and a number of planned action objects;
    selecting a plan from the first plan and the second plan for execution based on the comparison of the first plan to the second plan, the selected plan having at least one of a lower action object cost, a best action object quality, and a fewer number of planned action objects;
    executing the selected plan, and
    outputting a value associated with the output concept object of the selected plan.

2. The method of claim 1, wherein forming the intent comprises associating user data in the user input with the input concept object.

3. The method of claim 1, wherein forming the intent comprises outputting dialog that requests an additional user input.

4. The method of claim 3, wherein executing the first plan comprises using the additional user input to transform the input concept object into the output concept object.

5. The method of claim 1, wherein executing the first plan comprises using at least one of a user decision, a user preference, and user application contextual information to transform the input concept object into the output concept object.

6. A system for a dynamically evolving cognitive architecture planning, the system comprising:
    one or more processors; and
    a non-transitory computer readable medium storing a plurality of instructions,
    which when executed, cause the one or more processors to:
    form an intent based on a user input using a natural language intent interpreter, the intent being associated with an input concept object;
    create a first plan based on the intent, the first plan comprising a first input action object that transforms the input concept object into an intermediate concept object and a first output action object that transforms another intermediate concept object into an output concept object associated with a goal of the intent, the other intermediate concept object comprising one of a same object as the intermediate concept object and a different object from the intermediate concept object, the first input action object and the first output action object being selected from a plurality of action objects;

create a second plan based on the intent, wherein the second plan comprises a second input action object that transforms the input concept object into an alternative intermediate concept object and a second output action object that transforms another alternative intermediate concept object into the output concept object associated with the goal of the intent, the other alternative intermediate concept object comprising one of a same object as the alternative intermediate concept object and a different object from the alternative intermediate concept object, the second input action object and the second output action object being selected from the plurality of action objects;

compare the first plan with the second plan, the first plan and the second plan each having an action object cost, an action quality cost, and a number of planned action objects;

select a plan from the first plan and the second plan for execution based on the comparison of the first plan to the second plan, the selected plan having at least one of a lower action object cost, a best action object quality, and a fewer number of planned action objects;

execute the selected plan, and output a value associated with the output concept object of the selected plan.

7. The system of claim 6, wherein forming the intent comprises associating user data in the user input with the input concept object.

8. The system of claim 6, wherein forming the intent comprises outputting dialog that requests an additional user input.

9. The system of claim 8, wherein executing the first plan comprises using the additional user input to transform the input concept object into the output concept object.

10. The system of claim 6, wherein executing the first plan comprises using at least one of a user decision, a user preference, and user application contextual information to transform the input concept object into the output concept object.

11. The system of claim 6, wherein the user input is provided via at least one of typed entry of text via a keyboard, touch gestures, mouse gestures, and speech.

12. A computer program product, comprising a non-transitory computer-readable medium having a computer-readable program code embodied therein to be executed by one or more processors, the program code including instructions to:

form an intent based on a user input using a natural language intent interpreter, the intent being associated with an input concept object;

create a first plan based on the intent, the first plan comprising a first input action object that transforms the input concept object into an intermediate concept object and a first output action object that transforms another intermediate concept object into an output concept object associated with a goal of the intent, the other intermediate concept object comprising one of a same object as the intermediate concept object and a different object from the intermediate concept object, the first input action object and the first output action object being selected from a plurality of action objects;

create a second plan based on the intent, wherein the second plan comprises a second input action object that transforms the input concept object into an alternative intermediate concept object and a second output action object that transforms another alternative intermediate concept object into the output concept object associated with the goal of the intent, the other alternative intermediate concept object comprising one of a same object as the alternative intermediate concept object and a different object from the alternative intermediate concept object, the second input action object and the second output action object being selected from the plurality of action objects;

compare the first plan with the second plan, the first plan and the second plan each having an action object cost, an action quality cost, and a number of planned action objects;

select a plan from the first plan and the second plan for execution based on the comparison of the first plan to the second plan, the selected plan having at least one of a lower action object cost, a best action object quality, and a fewer number of planned action objects;

execute the selected plan, and output a value associated with the output concept object of the selected plan.

13. The computer program product of claim 12, wherein forming the intent comprises associating user data in the user input with the input concept object.

14. The computer program product of claim 12, wherein forming the intent comprises outputting dialog that requests an additional user input.

15. The computer program product of claim 14, wherein executing the first plan comprises using the additional user input to transform the input concept object into the output concept object.

16. The computer program product of claim 12, wherein executing the first plan comprises using at least one of a user decision, a user preference, and user application contextual information to transform the input concept object into the output concept object.

17. The computer program product of claim 12, wherein the user input is provided via at least one of typed entry of text via a keyboard, touch gestures, mouse gestures, and speech.

\* \* \* \* \*